(12) United States Patent
Sugioka

(10) Patent No.: US 11,198,482 B2
(45) Date of Patent: Dec. 14, 2021

(54) OSCILLATION-TYPE VEHICLE

(71) Applicant: HONDA MOTOR CO., LTD., Tokyo (JP)

(72) Inventor: Koichi Sugioka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 171 days.

(21) Appl. No.: 16/605,160

(22) PCT Filed: Apr. 20, 2018

(86) PCT No.: PCT/JP2018/016271
§ 371 (c)(1),
(2) Date: Oct. 14, 2019

(87) PCT Pub. No.: WO2019/003604
PCT Pub. Date: Jan. 3, 2019

(65) Prior Publication Data
US 2021/0031857 A1 Feb. 4, 2021

(30) Foreign Application Priority Data

Jun. 27, 2017 (JP) .............................. JP2017-125485
Jun. 27, 2017 (JP) .............................. JP2017-125486

(51) Int. Cl.
*B62K 5/027* (2013.01)
*B62J 45/40* (2020.01)
(Continued)

(52) U.S. Cl.
CPC .......... *B62K 5/027* (2013.01); *B60L 15/2036* (2013.01); *B62J 45/40* (2020.02);
(Continued)

(58) Field of Classification Search
CPC ........ B62K 5/027; B62K 5/10; B62K 25/283; B62K 5/06; B60L 15/2036; B62J 45/4151; B60K 7/0007
See application file for complete search history.

(56) References Cited

U.S. PATENT DOCUMENTS 3,605,929 A * 9/1971 Rolland ................. B62D 61/08
180/208
3,931,989 A * 1/1976 Nagamitsu ............... B62K 5/02
280/283
(Continued)

FOREIGN PATENT DOCUMENTS

CN       104736425 A       6/2015
JP       2005-193715       7/2005
(Continued)

OTHER PUBLICATIONS

International Preliminary Report on Patentability dated Jan. 9, 2020, 6 pages.
(Continued)

*Primary Examiner* — Frank B Vanaman
(74) *Attorney, Agent, or Firm* — Rankin, Hill & Clark LLP

(57) ABSTRACT

An oscillation-type vehicle includes a front vehicle body that suspends a front wheel in a steerable manner, a rear vehicle body that suspends left and right drive wheels, and an oscillation mechanism that causes the front vehicle body and the rear vehicle body to oscillate relative to each other. The oscillation-type vehicle being capable of carrying out drive control of the left and right drive wheels such that the drive wheels behave differently from each other in response to oscillation of the oscillation-type vehicle, wherein the drive control of the left and right drive wheels is carried out using information on the oscillation and information on a speed of vehicle.

8 Claims, 17 Drawing Sheets

(51) Int. Cl.
  B60L 15/20 (2006.01)
  B62K 5/10 (2013.01)
  H02P 5/50 (2016.01)
(52) U.S. Cl.
  CPC .................. *B62K 5/10* (2013.01); *H02P 5/50*
    (2013.01); *B60L 2220/46* (2013.01); *B60L*
    *2240/12* (2013.01); *B60L 2240/461* (2013.01)

(56) References Cited

U.S. PATENT DOCUMENTS

| | | | | |
|---|---|---|---|---|
| 4,549,624 | A * | 10/1985 | Doman | A61G 5/04 |
| | | | | 180/6.28 |
| 4,666,018 | A * | 5/1987 | Shibuya | B60G 11/225 |
| | | | | 180/213 |
| 6,276,480 | B1 * | 8/2001 | Aregger | B62D 31/003 |
| | | | | 180/213 |
| 8,267,205 | B2 * | 9/2012 | Ishii | B60K 17/30 |
| | | | | 180/6.44 |
| 2007/0138887 | A1 * | 6/2007 | Tonoli | B60K 6/52 |
| | | | | 310/112 |
| 2008/0006455 | A1 * | 1/2008 | Torita | B62D 11/003 |
| | | | | 180/6.28 |
| 2009/0312908 | A1 * | 12/2009 | Van Den Brink | B62K 5/027 |
| | | | | 701/38 |
| 2013/0297152 | A1 * | 11/2013 | Hayashi | B62K 5/10 |
| | | | | 701/42 |

FOREIGN PATENT DOCUMENTS

| | | |
|---|---|---|
| JP | 2005-198711 | 7/2005 |
| JP | 2008-012972 | 1/2008 |
| JP | 2008-265685 | 11/2008 |
| JP | 2011-020558 | 2/2011 |
| JP | 2012-101702 | 5/2012 |
| JP | 2013/051194 | 4/2013 |
| JP | 2013-220762 | 10/2013 |
| JP | 2015-063237 | 4/2015 |
| JP | 2016-222024 A | 12/2016 |
| WO | 2013/051194 | 4/2013 |
| WO | 2014/011821 | 1/2014 |
| WO | 2014/103522 A1 | 7/2014 |
| WO | 2014/203345 A1 | 12/2014 |
| WO | 2017/090666 A1 | 6/2017 |

OTHER PUBLICATIONS

International Search Report, dated Jun. 26, 2018, 2 pages.
Chinese Office Action with English translation dated Aug. 28, 2020, 12 pages.
Japanese Office Action with English translation dated Nov. 10, 2020, 6 pages.
Indian Office Action with English Text dated Dec. 15, 2020, 6 pages.

* cited by examiner

OSCILLATION-TYPE VEHICLE

TECHNICAL FIELD

The present invention relates to an oscillation-type vehicle.

BACKGROUND ART

Traditionally, amongst electric vehicles, a technique is known by which driving forces of left and right drive wheels are controlled to control the attitude of a vehicle (for example, see Patent Literatures 1 to 5).

In Patent Literature 1, in a four-wheel electric vehicle, a resolver is provided which detects wheel speeds of the left and right drive wheels, where distribution of the driving forces of the drive motors of the left and right drive wheels is determined on the basis of detected values of the wheel speeds.

The technique according to Patent Literature 1 which differentiates the driving forces of the left and right drive wheels on the basis of the detected values of the wheel speeds can be applied to Patent Literature 2 which was filed after Patent Literature 1. Patent Literature 2 is directed to a small three-wheeled oscillation vehicle that includes left and right rear wheels as its drive wheels.

In the above-described and similar three-wheeled oscillation vehicles, the oscillation angle of the vehicle body may be detected to carry out drive control of the left and right drive wheels, which will be appreciated from Patent Literature 3. In Patent Literature 3, a lean sensor is provided in a vehicle body adapted to oscillate, the left and right inclinations of the vehicle body are detected on the basis of the lean sensor to control the driving of the left and right drive wheels, and thereby the attitude of the vehicle body is controlled.

Also, in the three-wheeled oscillation vehicle of Patent Literature 4, rotations of left and right rear wheels as drive wheels are differentiated from each other on the basis of a detected value of a steering angle sensor that senses a steering angle of a front wheel so as to adjust stability at the time of turn maneuvering.

Also, as indicated in Patent Literature 5, in a three-wheeled vehicle that does not oscillate when making turns, the ratio between rotations of an inner wheel and an outer wheel of rear wheels is determined on the basis of a steering angle of a front wheel, and the rotation of the outer wheel is increased relative to the above-described rotation ratio so as to implement a scheme of control as an alternative to a differential mechanism to provide turning assistance.

CITATION LIST

Patent Literature

[Patent literature 1]
  Japanese Patent Application Laid-Open No. 2008-12972
[Patent literature 2]
  International Publication No. WO 2013/051194
[Patent literature 3]
  Japanese Patent Application Laid-Open No. 2011-20558
[Patent literature 4]
  International Publication No. WO 2014/011821
[Patent literature 5]
  Japanese Patent Application Laid-Open No. 2013-220762

SUMMARY OF INVENTION

Technical Problem

In the above-described traditional oscillation-type vehicles, whilst the oscillation angle of the vehicle body is detected based on the steering angle of the front wheel, the numbers of revolutions of the left and right drive wheels, the lean sensor, and the like and the left and right drive wheels can be controlled such that they behave differently from each other on the basis of the oscillation angle, it is desirable that the drive wheels be controlled more appropriately according to the state of the oscillation-type vehicles. Also, for example, oscillation-type vehicles whose rear wheels do not lean to the left or right at the time of turns to the left or right (the camber angle will be 0) are less optimized for making turns than vehicles whose rear wheels are configured to lean, so that it is desirable that the maneuverability and agility at the time of turn maneuvering be enhanced.

The present invention has been made in view of the above-described circumstances and an object of the present invention is to make it possible to more appropriately control drive wheels of an oscillation-type vehicle according to the state of the vehicle and enhance the maneuverability and agility at the time of turn maneuvering.

Solution to Problem

This specification incorporates the content of Japanese Patent Application Nos. 2017-125485 and 2017-125486 filed on Jun. 27, 2017 in their entirety.

According to a first aspect of the present invention, an oscillation-type vehicle includes: a front vehicle body (10) that suspends a front wheel (2) in a steerable manner; a rear vehicle body (11) that suspends left and right drive wheels (3L, 3R); and an oscillation mechanism (12) that causes the front vehicle body (10) and the rear vehicle body (11) to oscillate relative to each other, the oscillation-type vehicle being capable of carrying out drive control of the left and right drive wheels (3L, 3R) such that the drive wheels (3L, 3R) behave differently from each other in response to oscillation of the oscillation-type vehicle, wherein the drive control of the left and right drive wheels (3L, 3R) is carried out using information on the oscillation ($\theta$) and information on a speed of vehicle (V).

Also, according to a second aspect of the present invention, the information on the oscillation ($\theta$) may be detected on an oscillation shaft (25) of the oscillation mechanism (12).

Also, according to a third aspect of the present invention, the oscillation mechanism (12) may be a Neidhart mechanism and the information on the oscillation ($\theta$) may be sensing information of an angle sensor (29) provided on the oscillation shaft (25) of the Neidhart mechanism.

Further, according to a fourth aspect of the present invention, the drive control may include determining propensities (P1, P2) causing increase in a rotational force of an outer wheel of the left and right drive wheels (3L, 3R) relative to a rotational force of an inner wheel at the time of turn maneuvering with oscillation in response to a propensity of increase in an oscillation angle according to the information on the oscillation ($\theta$).

Also, according to a fifth aspect of the present invention, the propensities (P1, P2) causing the increase in the rotational force of the outer wheel relative to the rotational force of the inner wheel may vary depending on the speed of vehicle (V).

Also, according to a sixth aspect of the present invention, when the oscillation angle according to the information on the oscillation (θ) is equal to or smaller than a predetermined angle (θ1), the rotational force of the outer wheel and the rotational force of the inner wheel may be controlled to be equal to each other.

Also, according to a seventh aspect of the present invention, when a change in an oscillation angular velocity of oscillation according to the information on the oscillation (θ) is larger than a predetermined frequency, the rotational force of the outer wheel and the rotational force of the inner wheel may be controlled to be equal to each other.

Also, according to an eighth aspect of the present invention, the propensities (P1, P2) causing the rotational force of the outer wheel to increase relative to the rotational force of the inner wheel may cause the rotational force of the outer wheel to increase relative to the rotational force of the inner wheel when oscillation in one direction is started and a reference oscillation angle (θ1) is exceeded, and the amount of increase may be large at an initial stage of increase and gradually decrease.

Also, according to a ninth aspect of the present invention, the information on the oscillation (θ) may include an oscillation angular velocity, and a propensity causing the rotational force of the outer wheel to increase relative to the rotational force of the inner wheel may cause the rotational force of the outer wheel to increase relative to the rotational force of the inner wheel in proportion to increase in the oscillation angular velocity.

Also, according to a tenth aspect of the present invention, the drive control may include driving the drive wheels (3L, 3R) such that an inner/outer wheel speed ratio (Vo/Vi) which is a ratio of an actual speed of an outer wheel to an actual speed of an inner wheel becomes larger than a theoretical value (T) which is a ratio of a speed of the outer wheel to a speed of the inner wheel and is estimated from an oscillation angle (θ) of the vehicle, the speed of vehicle (V), and a wheel distance (L) between the left and right drive wheels (3L, 3R).

Advantageous Effects of Invention

According to the first aspect of the present invention, the oscillation-type vehicle includes the front vehicle body that suspends the front wheel in a steerable manner, the rear vehicle body that suspends the left and right rear drive wheels, and the oscillation mechanism that causes the front vehicle body and the rear vehicle body to oscillate relative to each other, drive control of the left and right drive wheels can be carried out such that the drive wheels behave differently from each other in response to oscillation of the oscillation-type vehicle, and the drive control of the left and right drive wheels is carried out using the information on the oscillation and the information on the speed of vehicle. By virtue of this, the state of turn maneuvering of the oscillation-type vehicle can be accurately recognized based on the information on the oscillation and the information on the speed of vehicle, so that the left and right drive wheels can be appropriately placed in the drive control on the basis of the state of turn maneuvering and the maneuverability and agility at the time of turn maneuvering can be enhanced.

Also, according to the second aspect of the present invention, the information on the oscillation may be detected on the oscillation shaft of the oscillation mechanism. According to this feature, the state of oscillation of the oscillation-type vehicle can be directly detected, and the state of turn maneuvering can be recognized accurately and quickly.

Also, according to the third aspect of the present invention, the oscillation mechanism may be a Neidhart mechanism, and the information on the oscillation may be sensing information of the angle sensor provided on the oscillation shaft of the Neidhart mechanism. According to this feature, the state of oscillation of the oscillation-type vehicle can be directly detected based on the behavior of the shaft of the Neidhart mechanism.

Further, according to the fourth aspect of the present invention, the drive control may include determining propensities causing increase in the rotational force of the outer wheel of the left and right drive wheels relative to the rotational force of the inner wheel at the time of turn maneuvering with oscillation in response to the propensity of increase in the oscillation angle according to the information on the oscillation. According to this feature, the rotational force of the outer wheel of the drive wheels can be increased relative to the rotational force of the inner wheel according to the increase in the oscillation angle, and the maneuverability and agility at the time of turn maneuvering can be effectively enhanced.

Also, according to the fifth aspect of the present invention, the propensities causing the increase in the rotational force of the outer wheel relative to the rotational force of the inner wheel may vary depending on the speed of vehicle. According to this feature, the rotational force of the outer wheel can be increased relative to the rotational force of the inner wheel according to the speed of vehicle, and it is made possible to implement enhanced turning force as appropriate according to the vehicle speed.

Also, according to the sixth aspect of the present invention, when an oscillation angle according to the information on the oscillation is equal to or smaller than a predetermined angle, the rotational force of the outer wheel and the rotational force of the inner wheel may be controlled to be equal to each other. According to this feature, in the small oscillation due to unevenness of the road surface or the like, the rotational force of the outer wheel and the rotational force of the inner wheel are made equal to each other. As a result, it is made possible to prevent the rotational force of the outer wheel and the rotational force of the inner wheel from being controlled to be different than each other in unnecessary cases.

Also, according to the seventh aspect of the present invention, when a change in an oscillation angular velocity of oscillation according to the information on the oscillation is larger than a predetermined frequency, the rotational force of the outer wheel and the rotational force of the inner wheel may be controlled to be equal to each other. According to this feature, in the oscillation due to unevenness of the road surface or the like, the rotational force of the outer wheel and the rotational force of the inner wheel are made equal to each other. As a result, it is made possible to prevent the rotational force of the outer wheel and the rotational force of the inner wheel from being controlled to be different than each other in unnecessary cases.

Also, according to the eighth aspect of the present invention, the propensities causing the rotational force of the outer wheel to increase relative to the rotational force of the inner wheel may cause the rotational force of the outer wheel to increase relative to the rotational force of the inner wheel when oscillation in one direction is started and a reference oscillation angle is exceeded, and the amount of increase may be large at the initial stage of increase and gradually decrease. According to this feature, it is made possible to appropriately increase the rotational force of the outer wheel at the initial stage of the turn maneuvering, and the maneuverability and agility at the time of turn maneuvering can be enhanced.

Also, according to the ninth aspect of the present invention, the information on the oscillation may include the oscillation angular velocity, and the propensity causing the rotational force of the outer wheel to increase relative to the rotational force of the inner wheel may cause the rotational force of the outer wheel to increase relative to the rotational force of the inner wheel in proportion to increase in the oscillation angular velocity. According to this feature, the rotational force of the outer wheel can be increased according to the oscillation angular velocity, and it is made possible to make a turn in an agile manner according to the intention of the rider.

Also, according to the tenth aspect of the present invention, the drive control may include driving the drive wheels such that an inner/outer wheel speed ratio which is a ratio of an actual speed of an outer wheel to an actual speed of an inner wheel becomes larger than a theoretical value which is a ratio of a speed of the outer wheel to a speed of the inner wheel and is estimated from an oscillation angle of the vehicle, the speed of vehicle, and a wheel distance between the left and right drive wheels. According to this feature, the rotational force of the outer wheel can be effectively increased, and the maneuverability and agility at the time of turn maneuvering is properly tuned.

DESCRIPTION OF EMBODIMENTS

An embodiment of the present invention will be described hereinbelow with reference to the drawings. It should be noted that, in the following description and illustration, directions such as front-rear, left-right, and up-and-down directions are each identical with the corresponding one of the directions defined with reference to the vehicle body unless otherwise specified. Also, the symbol FR that appears in each drawing indicates the front side of the vehicle body, the symbol UP indicates the upper side of the vehicle, and the symbol LH indicates the left side of the vehicle.

First Embodiment

Figure 1:
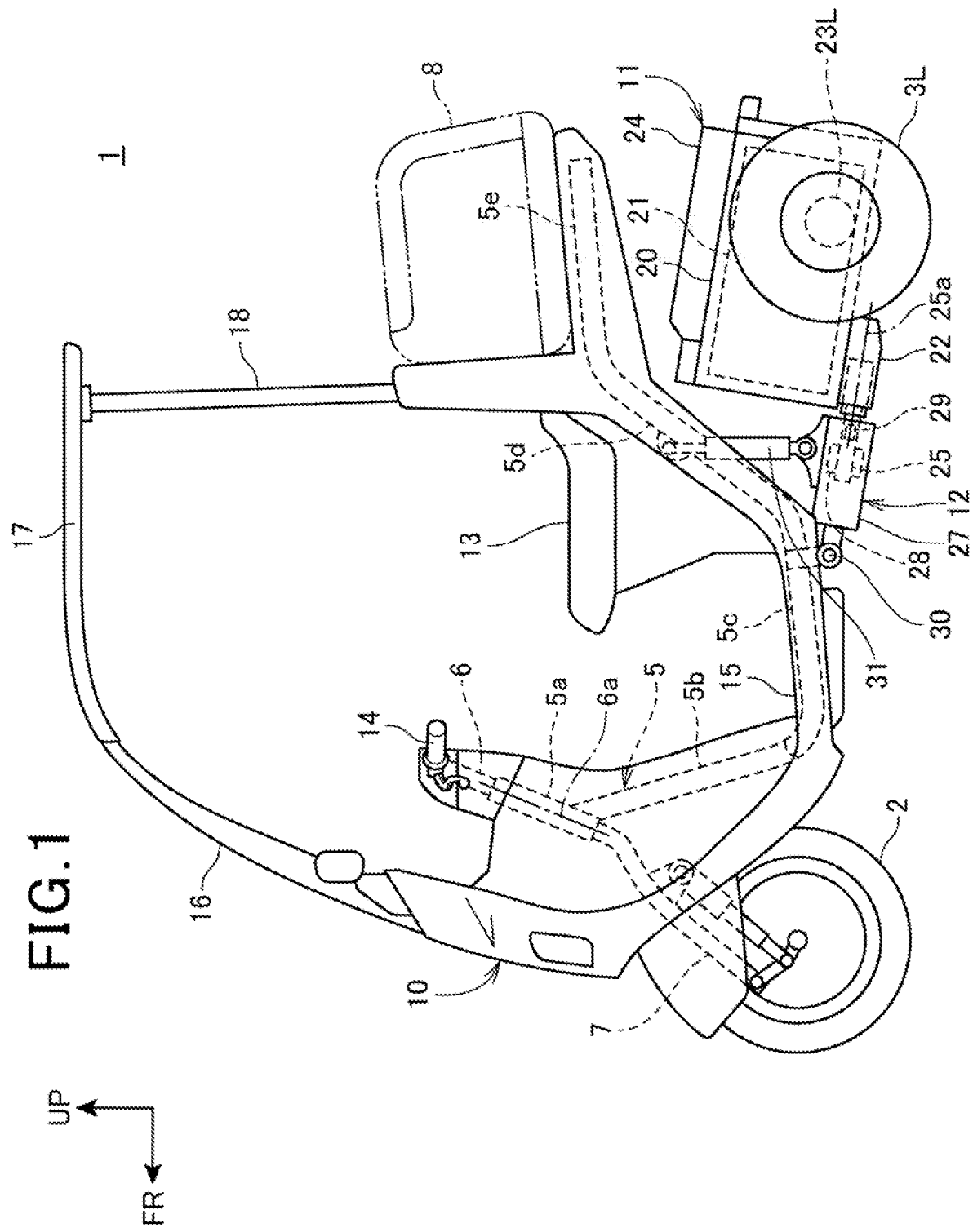
FIG. 1 is a left side view of a three-wheeled vehicle according to a first embodiment of the present invention.
Figure 2:
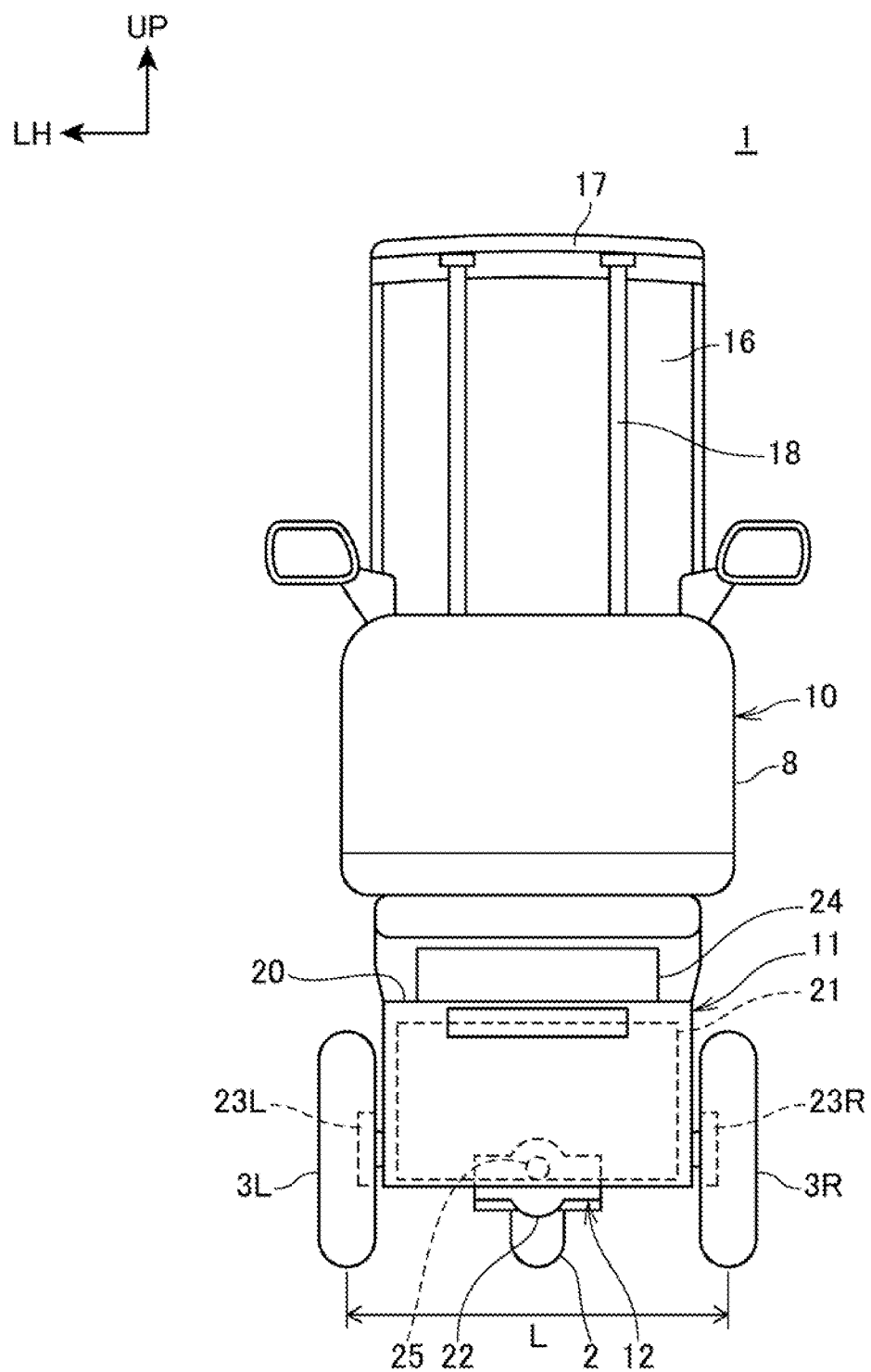
FIG. 2 is a rear view of the three-wheeled vehicle.

FIG. 1 is a left side view of a three-wheeled vehicle 1 according to a first embodiment of the present invention. FIG. 2 is a rear view of the three-wheeled vehicle 1.

The three-wheeled vehicle 1 (oscillation-type vehicle) includes a front vehicle body 10 that suspends a single front wheel 2 in a steerable manner; a rear vehicle body 11 that suspends a pair of rear wheels (left and right rear wheels) 3L and 3R (drive wheels); and an oscillation mechanism 12 that causes the front vehicle body 10 and the rear vehicle body 11 to oscillate relative to each other in a left and right direction.

The front vehicle body 10 includes a vehicle body frame 5, a seat 13 in which a rider is seated, a steering handle 14, and a low-floor step floor 15 on which the rider puts his/her feet.

The vehicle body frame 5 includes a head pipe 5a provided at its front end, a front frame 5b that extends rearward and downward from the head pipe 5a, a lower frame 5c that extends rearward from the lower end of the front frame 5b, a rear frame 5d that extends rearward and upward from the lower frame 5c, and a luggage rack frame 5e that extends substantially horizontally and rearward from the upper end of the rear frame 5d.

Also, the front vehicle body 10 includes a windshield 16 that covers the rider from the front side, a roof 17 that extends rearward from the upper end of the windshield 16, and a support pole 18 that extends rearward and downward from the rear portion of the roof 17 so as to cover the rider from the rear side.

A storage box 8 for luggage is provided on the rear side of the support pole 18. The storage box 8 is supported on the luggage rack frame 5e.

The steering shaft 6 is supported by a head pipe 5a and the steering handle 14 is fixed to the upper end of the steering shaft 6. The rotation shaft 6a of the steering shaft 6 is inclined rearward.

The front fork 7 extends forward and downward from the lower end portion of the steering shaft 6. The front wheel 2 is supported by a lower end portion of the front fork 7.

The front wheel 2 is maneuvered leftward and rightward by the steering handle 14 being rotated about the rotation shaft 6a.

The rear vehicle body 11 is arranged on the rear side of the rear frame 5d and below the luggage rack frame 5e.

The rear vehicle body 11 includes a battery case 20, a battery 21, a left motor 23L that drives the left rear wheel 3L, a right motor 23R that drives the right rear wheel 3R, and a control device 24 that controls the left motor 23L and the right motor 23R.

The battery case 20 is formed in the shape of a box in a substantially rectangular shape in the vehicle's side view so that the battery 21 is accommodated inside the battery case 20.

The right motor 23R is fixed to the right side wall of the battery case 20 with the motor shaft placed in an orientation to be directed in the vehicle width direction. The right motor 23R, which is an in-wheel motor that directly drives the right rear wheel 3R, is arranged on the inner circumferential side of the wheel portion of the rear wheel 3R.

The left motor 23L is fixed to the left side wall of the battery case 20 with the motor shaft placed in an orientation to be directed in the vehicle width direction. The left motor 23L, which is an in-wheel motor that directly drives the left rear wheel 3L, is arranged on the inner circumferential side of the wheel portion of the rear wheel 3L.

The control device 24 is fixed to the upper surface of the upper wall of the battery case 20.

The battery case 20 also functions as a frame component that supports the battery 21, the right motor 23R, the left motor 23L, the control device 24, and the oscillation mechanism 12 and is accordingly formed of a high-strength material.

The oscillation mechanism 12 includes a joint case 27 that is coupled to the rear portion of the lower frame 5c of the front vehicle body 10 so as to be swingable upward and downward, an oscillation shaft 25 inserted into the cylinder of the joint case 27 from the rear side, a bracket 22 that secures the oscillation shaft 25 to the rear vehicle body 11, and an elastic member 28 provided between the joint case 27 and the oscillation shaft 25.

The oscillation mechanism 12 is a damper device configured by a typical Neidhart mechanism.

More specifically, the oscillation shaft 25 is fixed to the lower wall of the battery case 20 via a bracket 22, and extended forward from the lower portion of the front portion of the battery case 20 in the vehicle's side view.

The oscillation shaft 25 is rotatable relative to the joint case 27 inside the joint case 27. The elastic member 28 is provided between the inner circumferential section of the cylindrical joint case 27 and a pressing section provided on the outer circumferential section of the oscillation shaft 25. The elastic member 28 is for example formed of rubber. When the oscillation shaft 25 rotates relative to the joint case 27, the elastic member 28 is compressed in the circumferential direction between the joint case 27 and the oscillation shaft 25.

The oscillation shaft 25 is positioned at the center in the width of the vehicle in the same manner as the front wheel 2. The axis 25a of the oscillation shaft 25 is not horizontal but slightly inclined rearward and downward in the vehicle's side view.

The rear wheels 3L and 3R are arranged on the left side and the right side, respectively, at equal spaces with reference to the center in the width of the vehicle. The wheel distance L between the left rear wheel 3L and the right rear wheel 3R is defined as the distance between the center in the width direction of the rear wheel 3L and the center in the width direction of the rear wheel 3R. Here, the wheel distance L is, for example, 500 mm.

The front vehicle body 10 is configured to be capable of oscillating to the left and right about the oscillation shaft 25 relative to the rear vehicle body 11 in a state where the rear wheels 3L and 3R are in contact with the ground, and the camber angle of the rear wheels 3L and 3R is 0° even at the time of the oscillation. Specifically, the three-wheeled vehicle 1 is a saddle-style oscillation-type three-wheeled vehicle whose front vehicle body 10 can oscillate to the left and right relative to the rear vehicle body 11 at the time of turn maneuvering. When the front vehicle body 10 oscillates to the left and right, a reaction force in the return direction against the oscillation is generated against the compression of the elastic member 28 in the above-mentioned Neidhart mechanism.

The three-wheeled vehicle 1 includes an oscillation angle sensor 29 (angle sensor) that senses leftward and rightward oscillations of the front vehicle body 10. The oscillation angle sensor 29 is provided on the oscillation shaft 25 of the oscillation mechanism 12, and detects the angle of the relative rotation of the oscillation shaft 25 relative to the joint case 27. The angle of the relative rotation of the oscillation shaft 25 relative to the joint case 27 corresponds to the oscillation angle in the vertical direction of the front vehicle body 10. The oscillation angle sensor 29 is, for example, a potentiometer.

The front end of the joint case 27 is coupled to the front vehicle body 10 via a pivot shaft 30 extending in the vehicle width direction. The joint case 27 is capable of swinging upward and downward about the pivot shaft 30. Also, the rear vehicle body 11 is coupled to the front vehicle body 10 via a suspension 31 (buffer mechanism) extending upward and downward. One end of the suspension 31 is coupled to the rear frame 5d and the other end of the suspension 31 is coupled to the upper surface portion of the joint case 27.

In other words, the rear vehicle body 11 is provided so as to be swingable upward and downward via the pivot shaft 30 relative to the front vehicle body 10.

Figure 3:
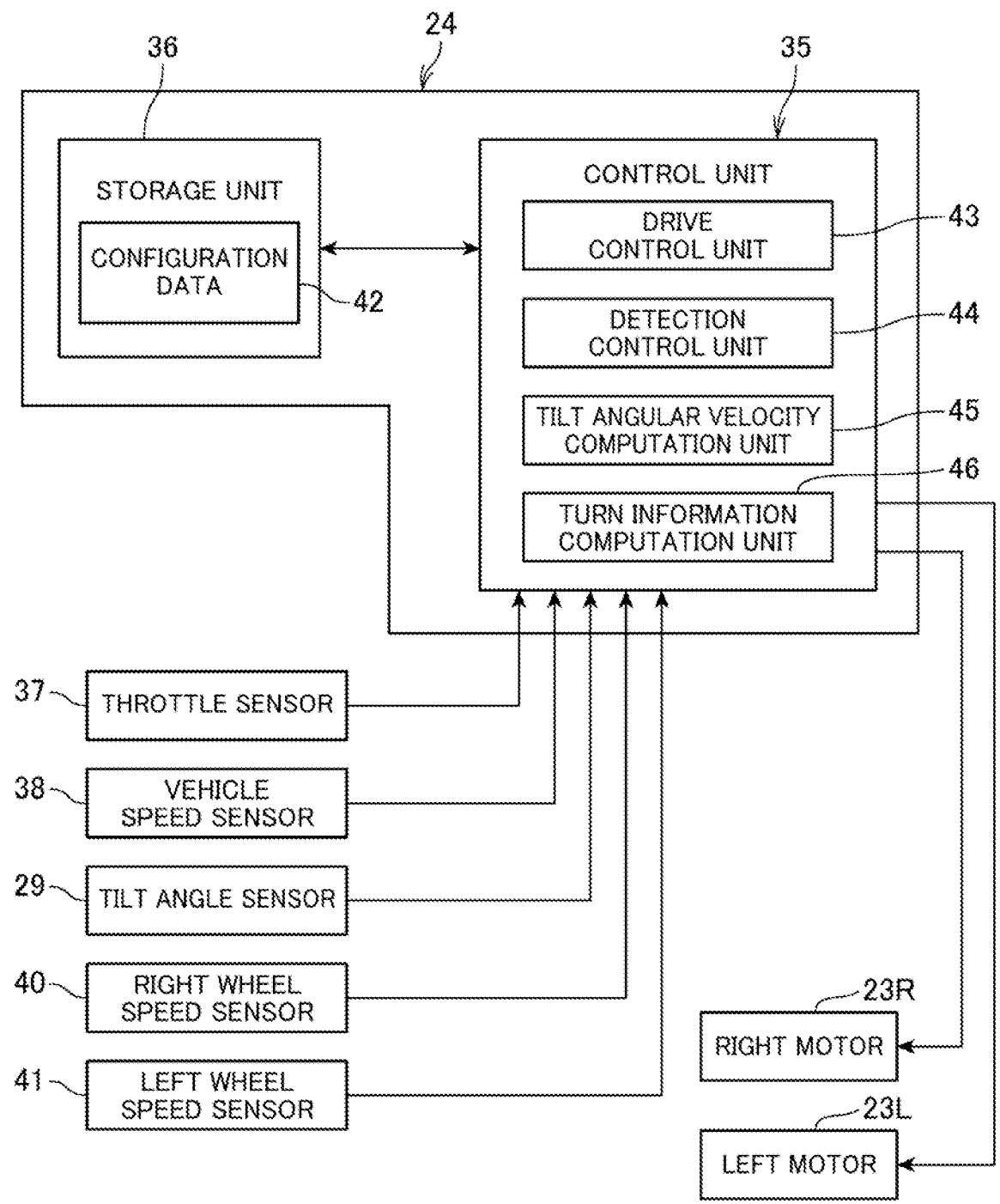
FIG. 3 is a functional block diagram of a control device.

FIG. 3 is a functional block diagram of the control device 24.

The control device 24 includes a control unit 35 and a storage unit 36. The control unit 35, which is a processor such as a central processing unit (CPU), controls the left motor 23L and the right motor 23R by running a program stored in the storage unit 36. The storage unit 36, which is a non-volatile storage device such as flash ROM and EEPROM units, stores programs that are run by the control unit 35, data to be processed by the control unit 35, and the like.

A throttle sensor 37, a vehicle speed sensor 38, the oscillation angle sensor 29, a right wheel speed sensor 40, and a left wheel speed sensor 41 are connected to the control unit 35.

A rider inputs his/her intention of acceleration to the control device 24 by operation on a throttle (not-shown) provided on the steering handle 14. The control unit 35 detects the operation amount of the throttle by the rider from the throttle sensor 37.

The control unit 35 detects, from the vehicle speed sensor 38, a travel speed (vehicle speed V (information on the speed of vehicle) which will be described later) of the three-wheeled vehicle 1. The vehicle speed sensor 38 is, for example, a sensor that senses the rotation of the front wheel 2.

The control unit 35 detects an oscillation angle θ (information on oscillation; See FIG. 5) of the three-wheeled vehicle 1 based on the oscillation angle sensor 29. Here, the oscillation angle θ of the three-wheeled vehicle 1 is an oscillation angle of the front vehicle body 10 with reference to the vertical direction.

The control unit 35 detects the rotation of the right rear wheel 3R from the right wheel speed sensor 40 and detects the rotation of the left rear wheel 3L from the left wheel speed sensor 41.

The various function units that the control unit 35 includes are formed by cooperation of software and hardware by the arithmetic unit of the control unit 35 that runs the programs.

The control unit 35 executes various processes using configuration data 42 stored in the storage unit 36 and controls the left motor 23L and the right motor 23R.

The control unit 35 has the functions of a drive control unit 43, a detection control unit 44, an oscillation angular velocity computation unit 45, and a turn information computation unit 46.

The drive control unit 43 controls the currents supplied to the left motor 23L and the right motor 23R.

The detection control unit 44 controls various detection operations of the control unit 35.

The oscillation angular velocity computation unit 45 computes an oscillation angular velocity of the front vehicle body 10 on the basis of the detected value of the oscillation angle sensor 29.

The turn information computation unit 46 computes a theoretical value T (FIG. 4) of the ratio between the rotation speed of the left rear wheel 3L and the rotation speed of the right rear wheel 3R.

The storage unit 36 stores the configuration data 42. The configuration data 42 includes various pieces of data to be processed by the control unit 35, programs for the control unit 35, arithmetic expressions, and control table information such as control information of increase in the rotational forces of the left motor 23L and the right motor 23R.

The control device 24 controls the left motor 23L and the right motor 23R independently from each other on the basis of the operation amount of the throttle detected by the throttle sensor 37.

In a state where the three-wheeled vehicle 1 makes almost no oscillation to the left or right and the three-wheeled vehicle 1 is traveling in a straight line, the control device 24 supplies the currents of the same magnitude to the left motor 23L and the right motor 23R and drives the rear wheel 3L and the rear wheel 3R with the same rotational force (torque).

The magnitude of the currents supplied to the left motor 23L and the right motor 23R and the torques occurring in the rear wheel 3L and the rear wheel 3R have a substantially proportional relationship.

In a state where it is determined that the three-wheeled vehicle 1 is making a turn, the control device 24 carries out turning assist control to differentiate the magnitudes of the currents to be supplied to the left rear wheel 3L and the right rear wheel 3R from each other.

More specifically, in the turning assist control, the control device 24 individually controls the left motor 23L and the right motor 23R such that the rotational force of the outer wheel of the left and right rear wheels 3L and 3R at the time of turn maneuvering becomes larger than the rotational force of the inner wheel.

Here, the inner wheel of the rear wheels 3L and 3R is the rear wheel in the oscillation direction of the three-wheeled vehicle 1 in the turning state, and the outer wheel of the rear wheels 3L and 3R is the rear wheel positioned on the outer side of the inner wheel. For example, if the three-wheeled vehicle 1 oscillates to the right side to turn to the right, the right rear wheel 3R is the inner wheel and the left rear wheel 3L is the outer wheel.

Figure 4:
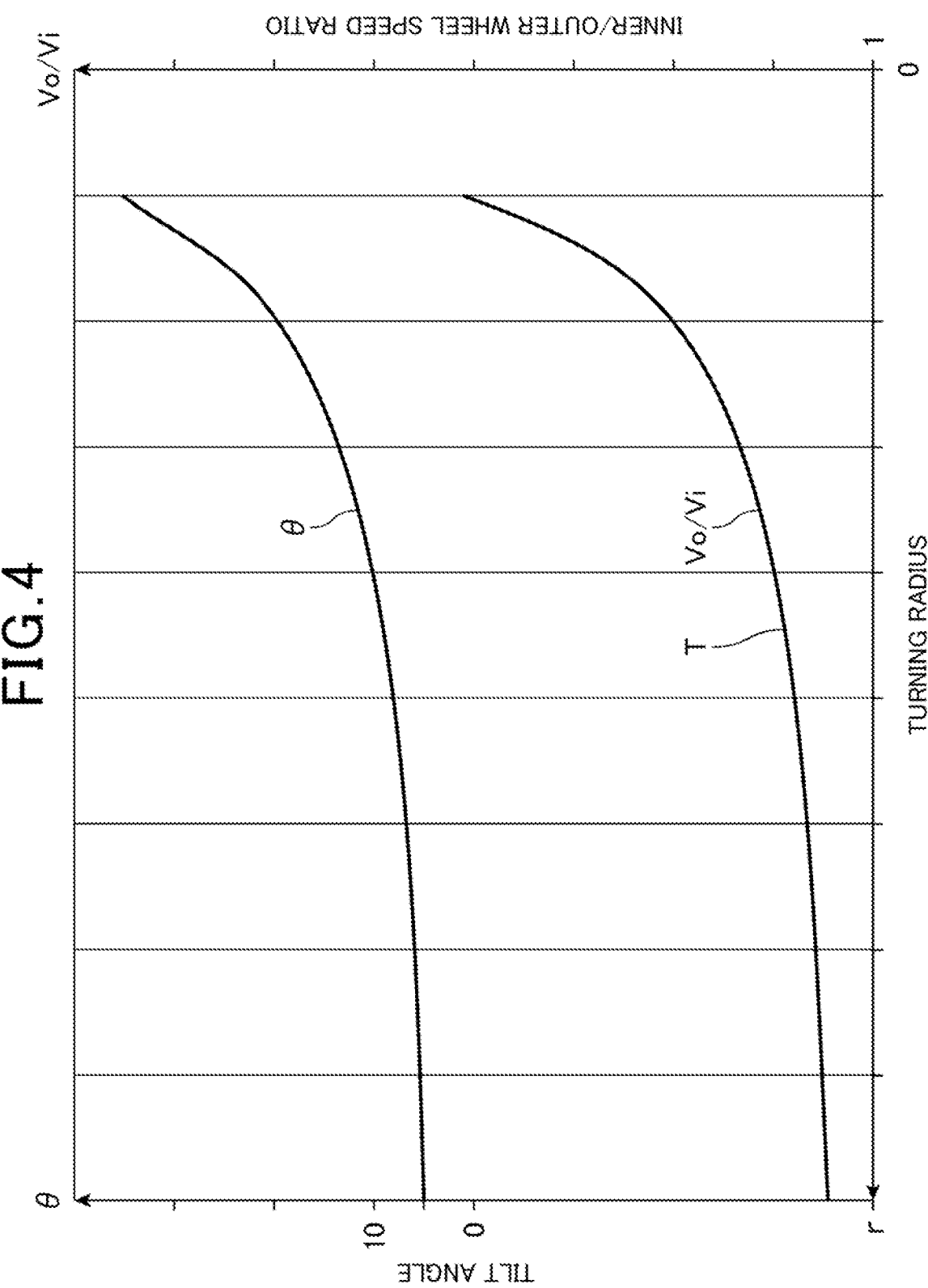
FIG. 4 is a chart illustrating the relationship between a turning radius of the three-wheeled vehicle, an oscillation angle of the three-wheeled vehicle, and an inner/outer wheel speed ratio of the rear wheels.

FIG. 4 is a chart illustrating the relationship between a turning radius r (turn information) of the three-wheeled vehicle 1, an oscillation angle θ of the three-wheeled vehicle 1, and an inner/outer wheel speed ratio Vo/Vi of the rear wheels 3L and 3R. With regard to the turning radius r indicated by the horizontal axis of the graph, the left side in the figure indicates the positive (+) side (so that a value on the left side is larger than a value on the right side). Here, the inner/outer wheel speed ratio Vo/Vi indicates the ratio between the wheel speed Vi and the wheel speed Vo, where the wheel speed Vi indicates the wheel speed of the inner wheel in the turning direction and the wheel speed Vo indicates the wheel speed of the outer wheel in the turning direction.

Figure 5:
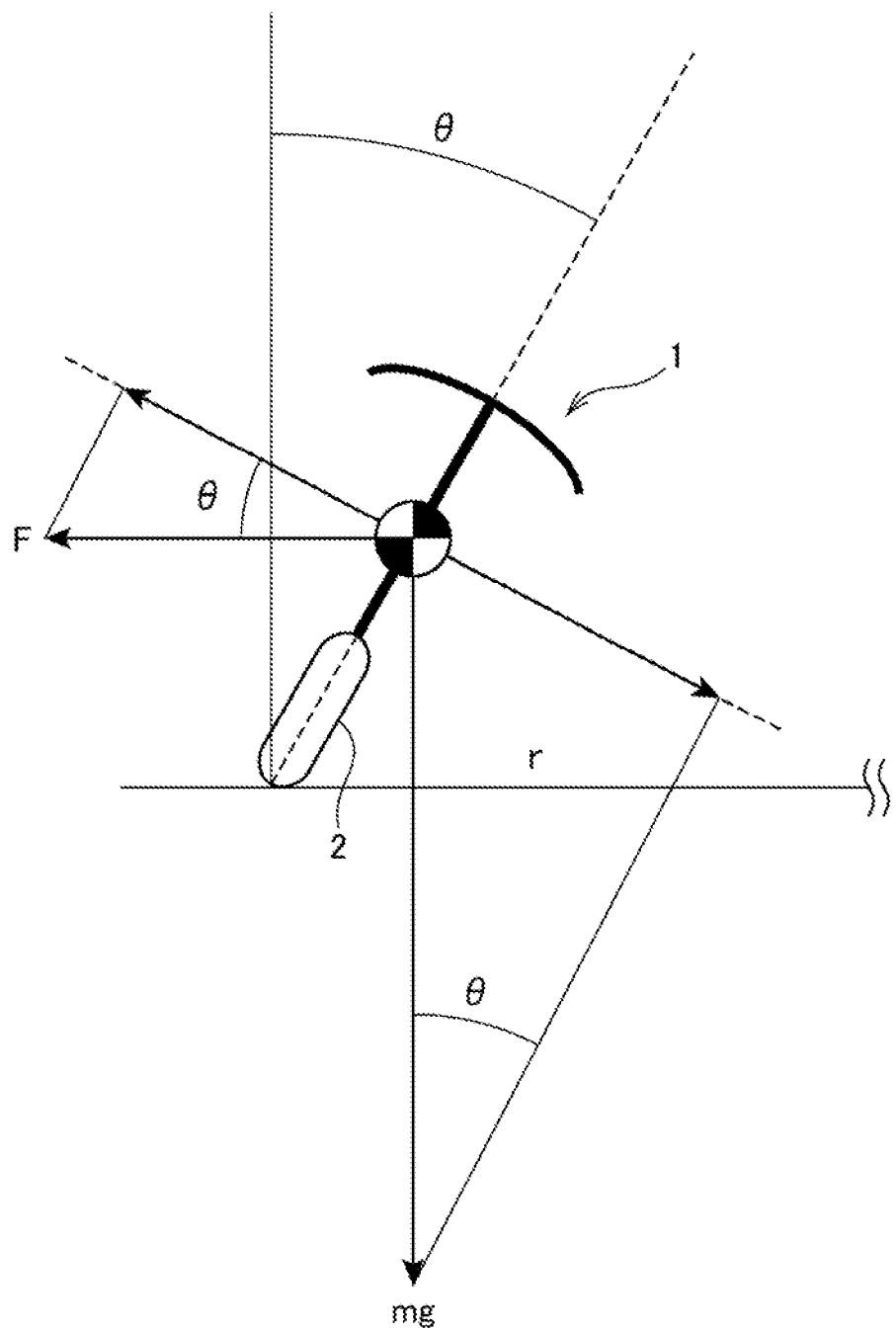
FIG. 5 is a diagram illustrating the relationship between the oscillation angle, the turning radius, and a vehicle speed.
Figure 6:
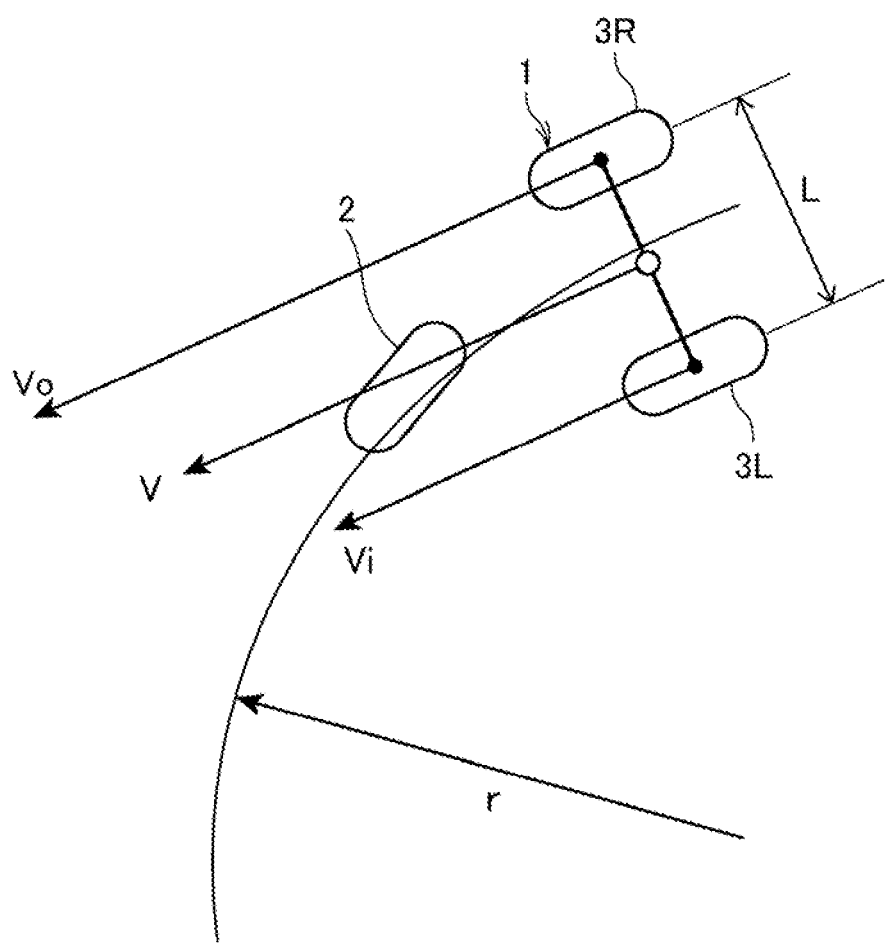
FIG. 6 is a diagram illustrating the relationship between a wheel speed of the inner wheel, a wheel speed of the outer wheel, the vehicle speed, the turning radius, and a wheel distance.

FIG. 5 is a diagram illustrating the relationship between the oscillation angle θ, the turning radius r, and a vehicle speed V. FIG. 6 is a diagram illustrating the relationship between the wheel speed Vi of the inner wheel, the wheel speed Vo of the outer wheel, the vehicle speed V, the turning radius r, and the wheel distance L.

Here, FIG. 4 illustrates the relationship (theoretical value) between the turning radius r, the oscillation angle θ, and the inner/outer wheel speed ratio Vo/Vi in a state where the vehicle speed V takes a constant value (e.g., 30 km/h).

In FIG. 5, the symbol m is the mass of the three-wheeled vehicle 1, the symbol g is the gravity, and the symbol F is the centrifugal force acting on the three-wheeled vehicle 1 at the time of turn maneuvering.

Referring to FIG. 5, the turning radius r can be determined according to the following expression (1) based on the balance relationship between centrifugal force and gravity:

$$r=V^2/g \times 1/\tan\theta \tag{1}$$

In other words, the expected turning radius r can be estimated by the vehicle speed V and the oscillation angle θ.

Referring to FIG. 6, the inner/outer wheel speed ratio Vo/Vi can be determined according to the following expression (2):

$$Vo/Vi=(2r+L)/(2r-L) \tag{2}$$

Here, since the wheel distance L is constant, the theoretical value of the inner/outer wheel speed ratio Vo/Vi will be determined when the turning radius r is known.

When the expression (1) is assigned to the expression (2), the inner/outer wheel speed ratio Vo/Vi is computed according to the following expression (3):

$$Vo/Vi=(2V^2+Lg\tan\theta)/(2V^2-Lg\tan\theta) \tag{3}$$

In other words, the theoretical value of the inner/outer wheel speed ratio Vo/Vi can be computed based on the oscillation angle θ, the vehicle speed V, and the wheel distance L.

According to the theoretical value illustrated in FIG. 4, the smaller the turning radius r, the larger the oscillation angle θ if the vehicle speed V is constant.

In general, at the time of turn maneuvering, the outer wheel of the rear wheels 3L and 3R has a larger wheel speed than the inner wheel since the outer wheel makes a larger turn than that of the inner wheel. As a result, in a state where the three-wheeled vehicle 1 is making a turn, the value of the inner/outer wheel speed ratio Vo/Vi is equal to or greater than 1. Also, the inner/outer wheel speed ratio Vo/Vi becomes larger when the turning radius r becomes smaller.

Figure 7:
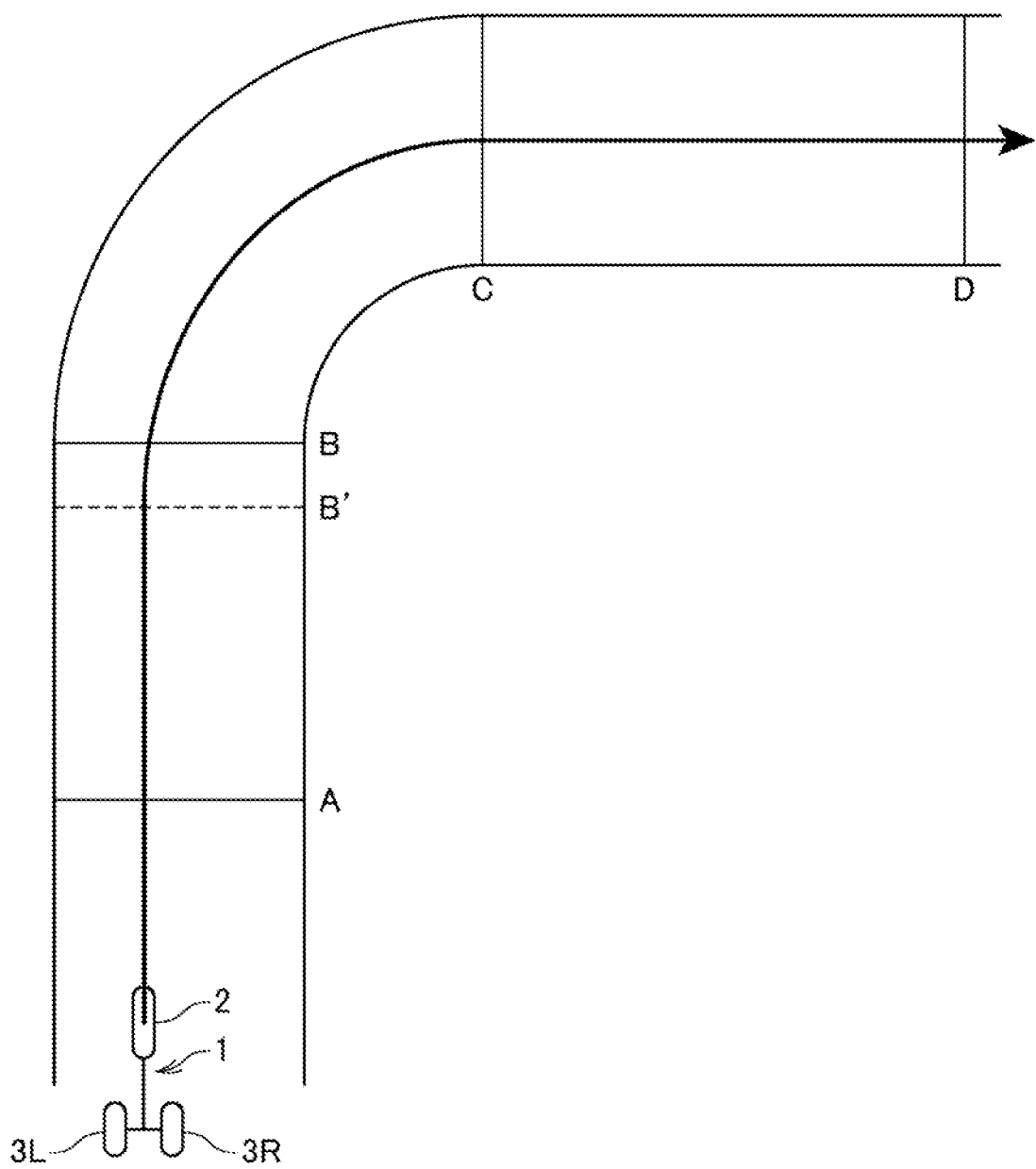
FIG. 7 is a diagram illustrating a traveling model in the case where the three-wheeled vehicle makes a turn.
Figure 8:
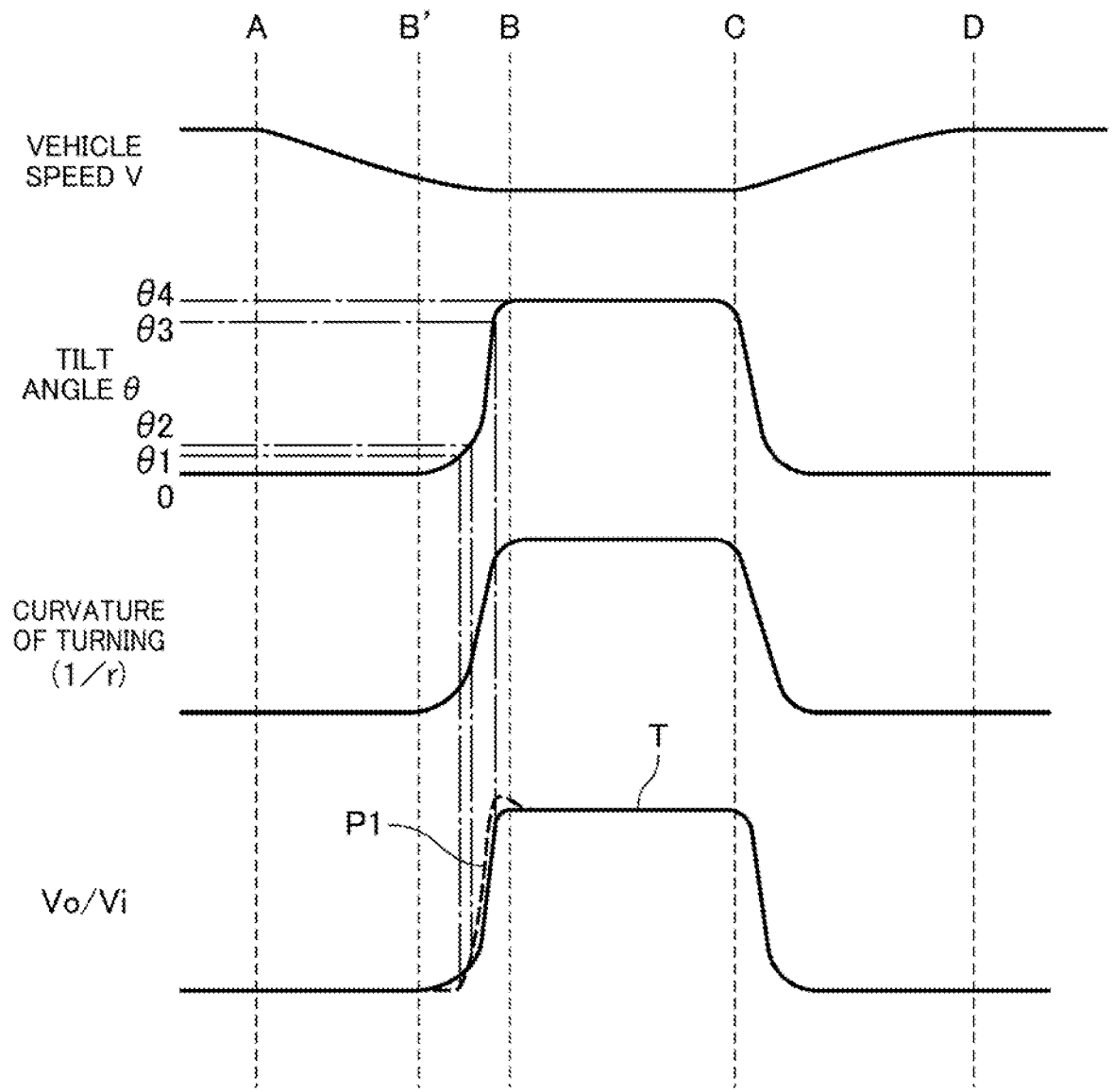
FIG. 8 is a diagram illustrating the relationship between the vehicle speed, the oscillation angle, a curvature of turning, and the inner/outer wheel speed ratio in the traveling model of FIG. 7.

FIG. 7 is a diagram illustrating the traveling model in the case where the three-wheeled vehicle 1 makes a turn. FIG. 8 is a diagram illustrating the relationship between the vehicle speed V, the oscillation angle θ, the curvature of turning 1/r, and the inner/outer wheel speed ratio Vo/Vi in the traveling model of FIG. 7. Here, the curvature of turning 1/r is the reciprocal of the turning radius r.

In FIG. 7, the traveling model is illustrated where the three-wheeled vehicle 1 that is traveling in a straight line turns to the right and then again travels in a straight line.

The road stretches straight from a point A to a point B, curves from the point B to a point C, and again stretches straight from the point C to a point D.

Hereinafter, control of Vo/Vi will be described using this traveling model as an example.

The three-wheeled vehicle 1 travels in a straight line from the point A to the point B and starts to make a turn to the right side at the point B' which is lightly before the point B.

The vehicle speed V gradually decreases from the point A to the point B depending on the operation on the throttle and the operation on the brake by the rider. The oscillation angle θ is 0° from the point A to the point B'. The curvature of turning 1/r is 0 from the point A to the point B'. The inner/outer wheel speed ratio Vo/Vi is 1 from the point A to the point B'. Specifically, since the three-wheeled vehicle 1 travels in the straight line from the point A to the point B', the wheel speeds of the left and right rear wheels 3L and 3R are equal to each other.

The rider of the three-wheeled vehicle 1 causes the front vehicle body 10 to bank during the interval from the point B' to the point B to make it oscillate to the right side. The oscillation angle θ and the curvature of turning 1/r become larger toward the side of the point B. Also, the theoretical value T gradually increases to be slightly larger than 1 in the interval from the point B' to the point B, but the control device 24 sets the value of Vo/Vi to 1 in a state where the oscillation angle θ is small and carries out control such that the value of Vo/Vi becomes larger than 1 when the oscillation angle θ becomes larger.

The three-wheeled vehicle 1 makes a turn in the interval from the point B to the point C with the oscillation angle θ and the curvature of turning 1/r maintained at constant levels. As a result, the control device 24 controls the inner/outer wheel speed ratio Vo/Vi at a constant value in the interval from the point B to the point C.

The three-wheeled vehicle 1 restores the banked front vehicle body 10 to end the turn after having passed the point C and then travels in a straight line. When it passes the point C, the oscillation angle θ and the curvature of turning 1/r gradually decrease, in response to which the control device 24 gradually decreases the Vo/Vi to 1. The three-wheeled vehicle 1 starts acceleration at or near the point C according to a throttle operation by the rider, and the vehicle speed V increases.

When the rider decreases the degree of opening of the throttle (which includes complete closure) to decelerate the three-wheeled vehicle 1, the control device 24 carries out regeneration by the left motor 23L and the right motor 23R and charges the battery 21 using the regenerative power. At this point, the control device 24 controls the regeneration amounts of the left and right rear wheels 3L and 3R such that the inner/outer wheel speed ratio Vo/Vi follows the theoretical value T. The theoretical value T can be computed according to the above-described expression (3), for example, by the turn information computation unit 46.

Here, for example, in a case where it can be determined that the oscillation angle θ increases and the turning radius r has decreased, the control device 24 may maintain the driving force of the motor in the outer wheel and carry out control such that the regeneration only takes place on the side of the inner wheel.

Figure 9:
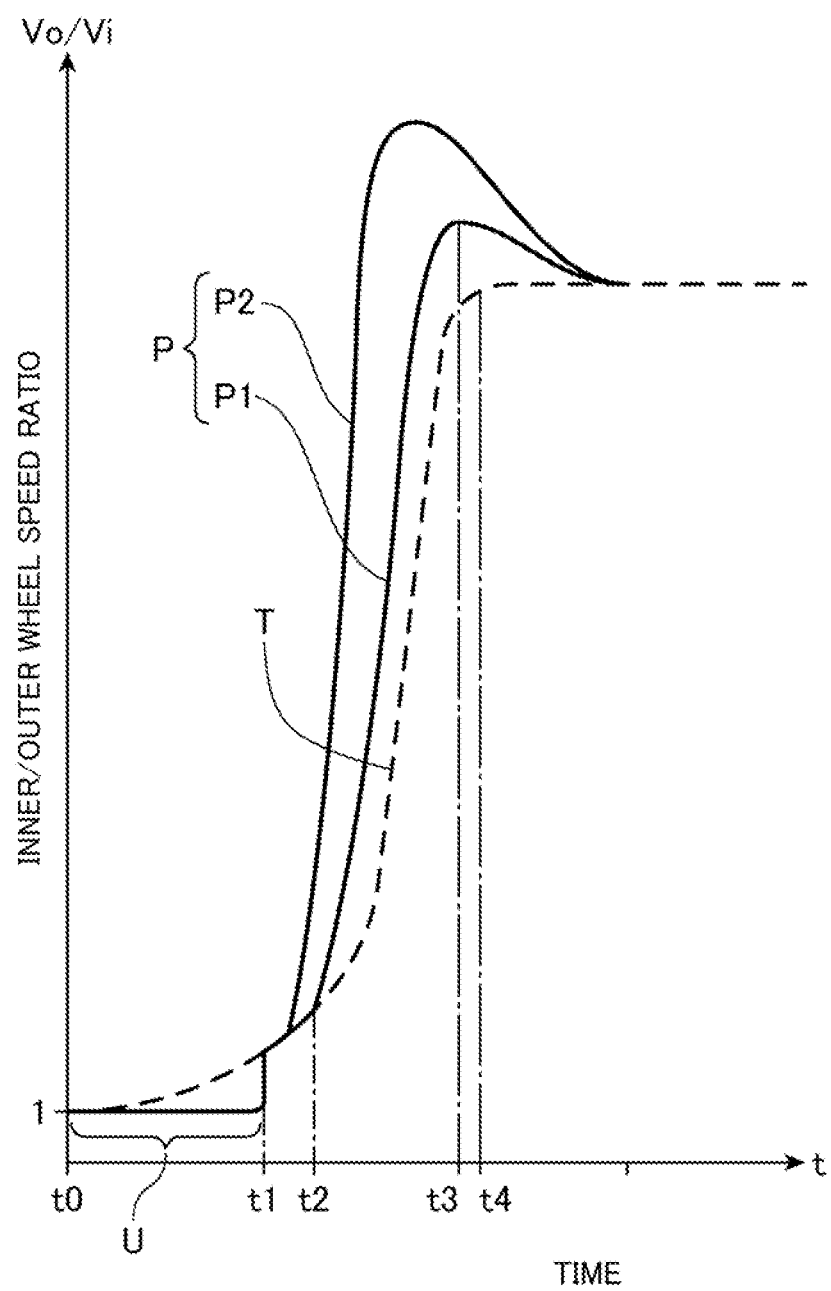
FIG. 9 is a chart illustrating a change in the inner/outer wheel speed ratio through turning assist control of the control device.

FIG. 9 is a chart chronologically illustrating a change in the inner/outer wheel speed ratio Vo/Vi through the turning assist control by the control device 24.

In FIG. 9, the change in the inner/outer wheel speed ratio Vo/Vi in the interval from the point B' to the point B of FIG. 8 is indicated with respect to the time t. Also, FIG. 9 illustrates time t0, time t1, time t2, time t3, and time t4 corresponding to the point B' to the point B in this order.

In a case where the vehicle speed V and the detected value of the oscillation angle θ satisfy predetermined conditions, when the throttle is opened by the rider, the control device 24 drives the left motor 23L and the right motor 23R such that the inner/outer wheel speed ratio Vo/Vi is greater than the theoretical value T. More specifically, the drive control unit 43 of the control device 24 supplies the current corresponding to the inner/outer wheel speed ratio Vo/Vi to the left motor 23L and the right motor 23R on the basis of the theoretical value T computed by the turn information computation unit 46.

Also, the control device 24 causes the propensity (pattern) P of causing the inner/outer wheel speed ratio Vo/Vi to be larger than the theoretical value T to change according to the oscillation angular velocity of the front vehicle body 10. The oscillation angular velocity is computed by the oscillation angular velocity computation unit 45 (FIG. 3).

In FIG. 9, amongst the propensities P of the change in the inner/outer wheel speed ratio Vo/Vi, the propensity P1 and the propensity P2 are illustrated. The propensity P1 is an example of the control in the case where the oscillation angular velocity is the oscillation angular velocity X (not-shown) which is equal to or larger than the predetermined oscillation angular velocity W (not-shown), and the propensity P2 is an example of control in the case where the oscillation angular velocity is the oscillation angular velocity Y (not-shown) which is larger than the oscillation angular velocity X.

In a case where the oscillation angular velocity is larger than the predetermined oscillation angular velocity W, it can be determined that the rider makes the three-wheeled vehicle 1 oscillate more aggressively than usual as the oscillation angular velocity becomes larger.

Figure 10:
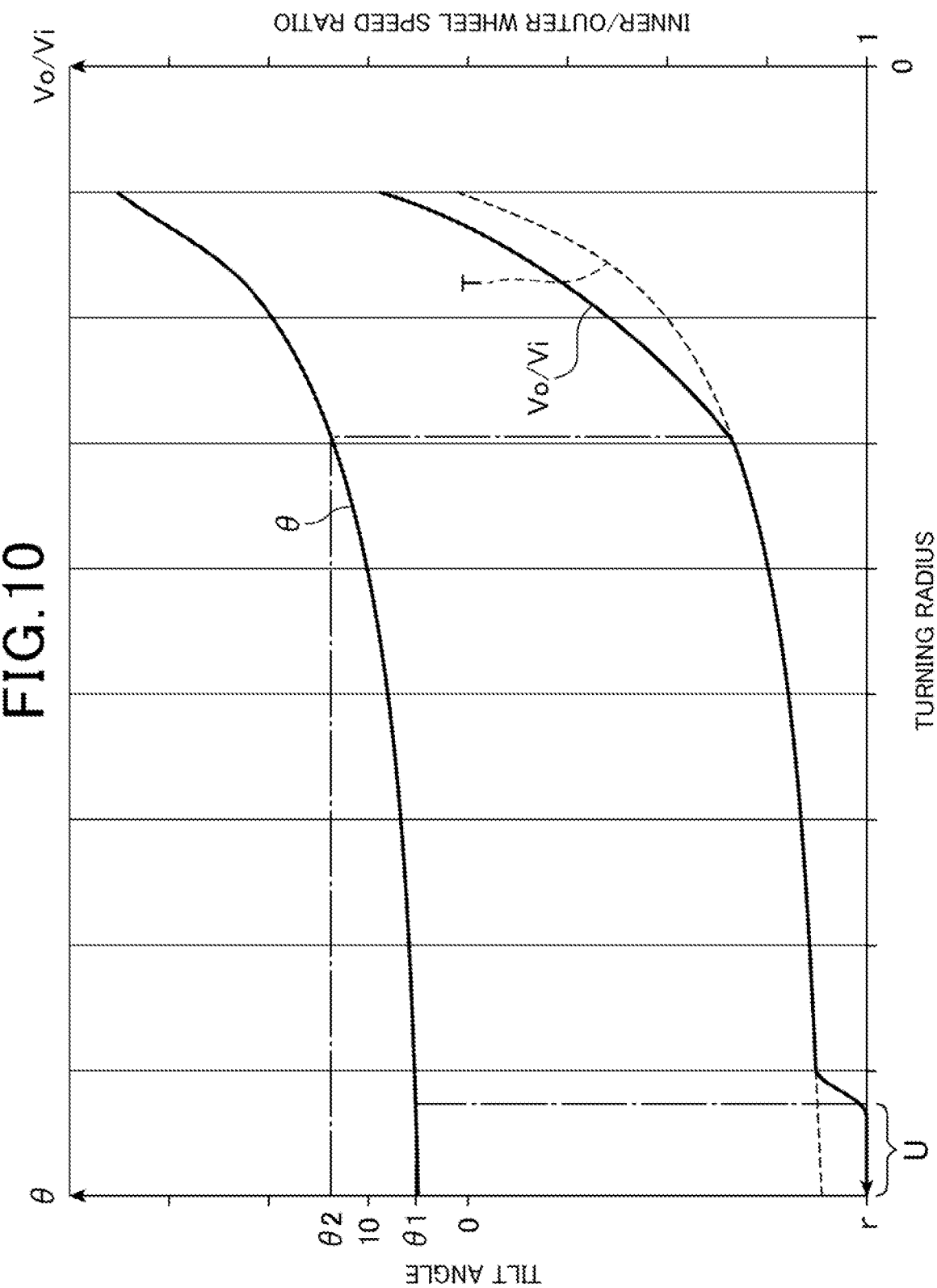
FIG. 10 is a chart corresponding to FIG. 4 and additionally illustrating a target value by control in the case of a propensity P1.

FIG. 10 is a chart corresponding to FIG. 4 and additionally illustrating the target value of control in the case of the propensity P1.

The times t0 to t4 in FIG. 9 correspond to the oscillation angles θ1 to θ4 in FIG. 8, respectively.

Referring to FIGS. 7 to 10 as well as FIG. 4, in a case where the three-wheeled vehicle 1 makes a turn to the right, when the vehicle speed V is at a predetermined value (e.g., 30 km/h), the oscillation angle exceeds θ1 (which corresponds to the time t1), and the oscillation angular velocity is equal to or larger than the predetermined oscillation angular velocity W, then the control device 24 drives the left motor 23L and the right motor 23R such that the value of the inner/outer wheel speed ratio Vo/Vi becomes larger than 1 in accordance with the oscillation angular velocity and the operation on the throttle. In a state where the oscillation angle is between θ1 and θ2 (which corresponds to the time t2), the control device 24 sets the target value of the inner/outer wheel speed ratio Vo/Vi to the theoretical value T.

When the oscillation angle becomes θ2 under the propensity P1, then the control device 24 drives the left motor 23L and the right motor 23R such that the value of the inner/outer wheel speed ratio Vo/Vi becomes larger than the theoretical value T.

By virtue of this, the wheel speed Vo of the rear wheel 3L which is the outer wheel is increased to be larger than the wheel speed of the outer wheel obtained from the theoretical value T. As a result, the turning force of the three-wheeled vehicle 1 can be assisted by the torque of the outer wheel, and the maneuverability and agility of turning of the three-wheeled vehicle 1 can be enhanced.

Here, although the control device 24 drives the left motor 23L and the right motor 23R with the propensity P1 used as the target value for the relationship between the wheel speed Vo of the left rear wheel 3L which acts as the outer wheel and the wheel speed Vi of the right rear wheel 3R, the actual inner/outer wheel speed ratio Vo/Vi does not need to always coincide with the propensity P1. It suffices that the control device 24 sets the ratio of the currents supplied to the outer wheel and the inner wheel to the ratio of the propensity P1. The control device 24 computes the propensity P according to the oscillation angular velocity and sets the ratio of the currents supplied to the outer wheel and the inner wheel to the computed ratio of the propensity P.

The propensity P2 in the case where the oscillation angular velocity is the oscillation angular velocity Y which is larger than the oscillation angular velocity X will be described in comparison with the propensity P1. In the case of the propensity P2, the inner/outer wheel speed ratio Vo/Vi is set to be larger than the propensity P1, and the wheel speed Vo of the outer wheel will be larger than that in the case of the propensity P1. As a result, the turning force can be enhanced effectively in response to the case where the rider attempts to make a turn aggressively. It should be noted that the time to reach the angle θ2 making the Vo/Vi larger than the theoretical value T will be shorter in the case of the propensity P2 than in the case of the propensity P1 (see FIG. 9).

Under any of the propensities P, an unassisted region U is specified in which increase in the speed of the outer wheel with respect to the theoretical value T does not take place. The unassisted region U is specified as a region where the oscillation angle θ of the three-wheeled vehicle 1 is small.

More specifically, referring to FIGS. 8 to 10 as well as FIG. 4, the unassisted region U is specified to cover a range where the oscillation angle θ is 0° to θ1 (predetermined angle, reference oscillation angle). Here, the oscillation angle θ1 is, for example, 5°. The unassisted region U corresponds, in FIG. 9, to the period of time from the time t0 to the time t1.

In a case where the three-wheeled vehicle 1 has oscillated in a state where the rider opened the throttle in the unassisted region U, the control device 24 supplies the currents of the same magnitude to the left and right rear wheels 3L and 3R such that the inner/outer wheel speed ratio Vo/Vi becomes 1, and thus drives the rear wheels 3L and 3R. As a result, in a case where the three-wheeled vehicle 1 makes a small oscillation due to unevenness of the road surface or the like, increase in the speed of the outer wheel does not take place. As a result, it is made possible to prevent either of the speeds of the rear wheels 3L and 3R from being increased in unnecessary cases.

It should be noted that, in a case where the three-wheeled vehicle 1 is turning at a constant speed and with a constant oscillation angle, the control is performed even in the unassisted region U such that the inner/outer wheel speed ratio Vo/Vi becomes the theoretical value T.

Whether or not the speed is constant and the oscillation angle is constant may be determined on the basis of the fact that the frequency of the oscillation based on detection by the oscillation angle sensor 29 is equal to or lower than a predetermined value (the period of the oscillation is equal to or longer than a predetermined period).

Under the propensity P1, when the three-wheeled vehicle 1 starts to oscillate in one direction and the oscillation angle θ exceeds the oscillation angle θ1 which is the reference oscillation angle, then the control to increase the speed of the outer wheel relative to that of the inner wheel is started.

Under the propensity P1, at the initial stage where the oscillation angle is from θ1 to θ3 (which corresponds to the time t3), the inner/outer wheel speed ratio Vo/Vi is controlled such that it increases in response to the increase in the oscillation angle θ. Here, the oscillation angle θ3 is an angle that is smaller than the oscillation angle θ4 (which corresponds to the time t4) corresponding to the point B.

Also, under the propensity P1, at the later stage where the oscillation angle is larger than θ3, the inner/outer wheel speed ratio Vo/Vi is controlled such that it decreases in response to the increase in the oscillation angle θ and eventually coincides with the theoretical value T with the passage of time.

In other words, under the propensity P1, the degree of increase in the inner/outer wheel speed ratio Vo/Vi relative to the oscillation angle θ is larger at the initial stage of the oscillation and gradually decreases at the later stage. As a result, the speed of the outer wheel can be increased relative to the inner wheel at the initial stage of turning of the three-wheeled vehicle 1, making it possible to perform agile turn maneuvering according to the intention of the rider. The scheme of setting ensuring that the inner/outer wheel speed ratio Vo/Vi becomes large at the initial stage of oscillation also applies to the propensity P2.

In a case where the oscillation angular velocity is smaller than the above-described predetermined oscillation angular velocity W, it can be determined that the rider does not want to start agile turn maneuvering and, when the oscillation angle is equal to or larger than θ1, the control device 24 makes the target value of Vo/Vi to be equal to the theoretical value T. In this case, the oscillation vehicle 1 starts to turn moderately.

It should be noted that, as has been discussed in the foregoing, the propensity P is to increase the propensity of increase above the theoretical value T in association with the oscillation angular velocity, but the propensity of the increase in the inner/outer wheel speed ratio Vo/Vi may be gradually saturated at or above a second predetermined angular velocity Z (not-shown) which is faster than the oscillation angular velocity Y corresponding to the propensity P2 of the example and an upper limit may be set for the value of the inner/outer wheel speed ratio Vo/Vi which serves as the target value of the control of the control device 24.

The propensity P may vary depending on the vehicle speed V.

In this embodiment, in a high speed range (e.g., 60 km/h or more), when compared with a low to medium speed range, the propensity P causing the inner/outer wheel speed ratio Vo/Vi to be larger than the theoretical value T is specified so as to be smaller than in the low to medium speed range (e.g., 5 to 40 km/h). By virtue of this, in the high speed range, drive wheel control is implemented in which stability of attitude takes precedence over agile turn maneuvering.

By virtue of this, it is possible to implement improvement in the appropriate turning force in accordance with the vehicle speed V.

Also, the propensity P may be configured such that a selector switch for the rider is provided to enable selection of whether or not the control of the propensity P should be activated and selection of the amount of increase in the propensity P causing the inner/outer wheel speed ratio Vo/Vi to be larger than the theoretical value T. In this case, in the case where the control of the propensity P is not activated, the inner/outer wheel speed ratio Vo/Vi basically controls the driving force of the left rear wheel 3L and the right rear wheel 3R always using the theoretical value T as the target value.

The rider can thereby select as appropriate whether or not the agility at the time of turn maneuvering should be sought for or the stability of attitude should be sought for.

Here, the above-described turning assist control is carried out on the basis of the table information which associates the relationships between the vehicle speed V, the oscillation angle θ, the estimated value of the turning radius r, the oscillation angular velocity, the inner/outer wheel speed ratio Vo/Vi and the like with each other.

In determination of the inner/outer wheel speed ratio Vo/Vi in the turning assist control, the table information is used in which the theoretical value T (turn information) computed based on the vehicle speed V, the oscillation angle θ, and the wheel distance L and the inner/outer wheel speed ratio Vo/Vi are associated with each other. The table information is specified such that the inner/outer wheel speed ratio Vo/Vi becomes larger than the theoretical value T.

Also, in the determination of the inner/outer wheel speed ratio Vo/Vi in the turning assist control, in place of what has been described above, table information may also be used in which the turning radius r (turn information) computed based on the vehicle speed V and the oscillation angle θ and the inner/outer wheel speed ratio Vo/Vi are associated with each other.

Specifically, the inner/outer wheel speed ratio Vo/Vi in the turning assist control is determined on the basis of the turn information determined at least based on the vehicle speed V and the oscillation angle θ.

It should be noted that the inner/outer wheel speed ratio Vo/Vi may be determined not only by the above-described table information but also a method of sequentially computing the ratios by an arithmetic expression or a method of compensating for the table information using an arithmetic expression.

Figure 11:
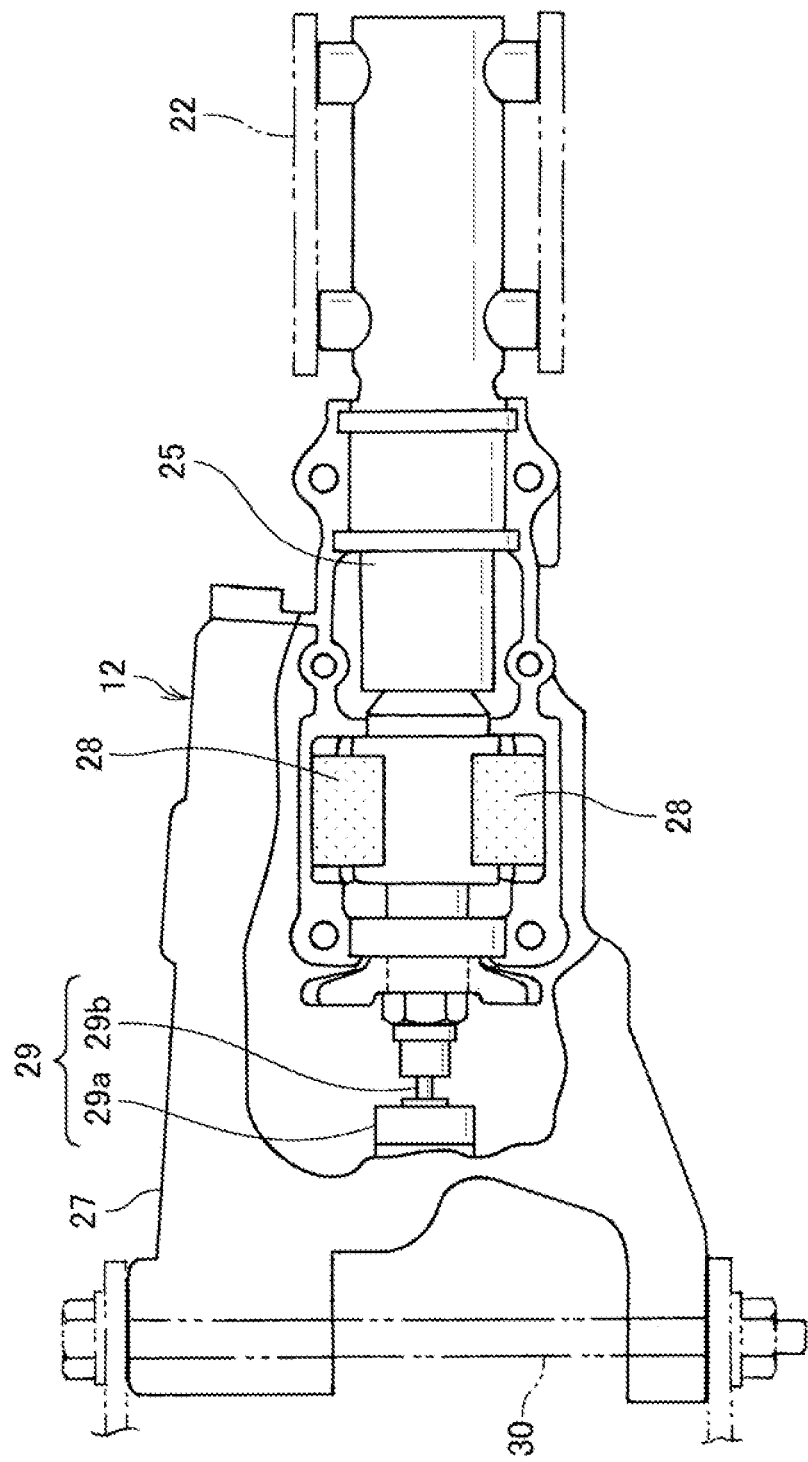
FIG. 11 is a top view where the state of mounting of an oscillation angle sensor is illustrated.

FIG. 11 is a top view where the state of mounting of the oscillation angle sensor 29 is illustrated. In FIG. 11, part of the joint case 27 is depicted with the internal structure.

The oscillation angle sensor 29 is a potentiometer and is accommodated in the inside of the joint case 27. The oscillation angle sensor 29 is arranged on the front side of the front end of the oscillation shaft 25 and arranged coaxially to the oscillation shaft 25.

The oscillation angle sensor 29 includes a detection unit 29a fixed to the inside of the joint case 27 and a shaft 29b rotatable relatively to the detection unit 29a.

The shaft 29b is fixed to the front end of the oscillation shaft 25 and extends forward from the front end of the oscillation shaft 25. The shaft 29b is arranged coaxially to the oscillation shaft 25.

The detection unit 29a rotates integrally with the joint case 27 in response to the oscillation of the front vehicle body 10.

The detection unit 29a detects relative rotation between the detection unit 29a and the shaft 29b, converts the result of the detection into an electrical signal, and sends it to the control device 24.

It should be noted that the oscillation angle sensor 29 is of a contact type but it may be a potentiometer of a non-contact type.

As has been described in the foregoing, according to the first embodiment in which the present invention is implemented, the three-wheeled vehicle 1 includes the front vehicle body 10 that suspends the front wheel 2 in a steerable manner, the rear vehicle body 11 that suspends the left and right rear wheels 3L and 3R which are the left and right drive wheels, and the oscillation mechanism 12 that causes the front vehicle body 10 and the rear vehicle body 11 to oscillate relative to each other, is capable of implementing drive control such that the rear wheels 3L and 3R act differently from each other depending on the oscillation, and the drive control of the left and right rear wheels 3L and 3R is carried out using the oscillation angle θ which is the information on oscillation and the vehicle speed V. By virtue of this, the turn information of the three-wheeled vehicle 1 can be accurately recognized based on the oscillation angle θ and the vehicle speed V, so that the drive control can be appropriately implemented to control the left and right rear wheels 3L and 3R on the basis of the highly accurate turn information and the maneuverability and the agility at the time of the turning can be enhanced.

Also, since the oscillation angle θ is detected on the oscillation shaft 25 of the oscillation mechanism 12, the oscillation angle θ of the three-wheeled vehicle 1 can be directly detected, which makes it possible to recognize the turn information accurately and quickly.

Also, since the oscillation mechanism 12 is a Neidhart mechanism and the oscillation angle θ is the sensing information of the oscillation angle sensor 29 provided on the oscillation shaft 25 of the Neidhart mechanism, the oscillation angle θ of the three-wheeled vehicle 1 can be directly detected based on the behavior of the oscillation shaft 25 of the Neidhart mechanism.

Further, the control device 24 determines, according to the propensity of increase in the oscillation angle θ, the propensities P1 and P2 causing the rotational force of the outer wheel of the left and right rear wheels 3L and 3R to increase to be larger than the rotational force of the inner wheel at the time of turn maneuvering with oscillation. As a result, in response to the increase in the oscillation angle θ, the rotational force of the outer wheel of the rear wheels 3L and 3R can be increased to be larger than the rotational force of the inner wheel, which makes it possible to effectively enhance the maneuverability and agility at the time of turn maneuvering.

Also, the propensities P1 and P2 causing the rotational force of the outer wheel to increase to be larger than the rotational force of the inner wheel vary depending on the vehicle speed V. As a result, the rotational force of the outer wheel can be increased to be larger than the rotational force of the inner wheel according to the vehicle speed V, which makes it possible to achieve appropriate enhancement of the turning force according to the vehicle speed V.

Also, in a case where the oscillation angle θ is not larger than the oscillation angle θ1 which is the predetermined angle, the control device 24 controls the rotational force of the outer wheel and the rotational force of the inner wheel to be equal to each other, so that the rotational force of the outer wheel and the rotational force of the inner wheel will be equal to each other in a small oscillation caused by unevenness of the road surface or the like. As a result, it is made possible to prevent the rotational force of the outer wheel and the rotational force of the inner wheel from being controlled to be different than each other in unnecessary cases.

Also, when oscillation is started in one direction and the oscillation angle θ1 which is the reference oscillation angle is exceeded, the propensities P1 and P2 causing the rotational force of the outer wheel to increase to be larger than the rotational force of the inner wheel causes the rotational force of the outer wheel to start to increase to be larger than the rotational force of the inner wheel, as a result of which the amount of increase becomes large at the initial stage of increase and gradually decreases. As a result, it is made possible to appropriately increase the rotational force of the outer wheel at the initial stage of the turn maneuvering, and properly tuned turn maneuverability can be obtained.

Also, the information on oscillation includes the oscillation angular velocity, and the propensities P1 and P2 causing the rotational force of the outer wheel to increase to be larger than the rotational force of the inner wheel causes the rotational force of the outer wheel to increase to be larger than the rotational force of the inner wheel in proportion to a larger oscillation angular velocity. As a result, the rotational force of the outer wheel can be increased according to the oscillation angular velocity, and it is made possible to make a turn in an agile manner according to the intention of the rider.

Also, the control device 24 controls the rear wheels 3L and 3R such that the inner/outer wheel speed ratio Vo/Vi which is the ratio of the speed of the outer wheel to the actual speed of the inner wheel to become larger than the theoretical value T which is the ratio of the speed of the outer wheel to the speed of the inner wheel and is estimated from the oscillation angle θ, the vehicle speed V, and the left and right wheel distance L. As a result, the rotational force of the outer wheel can be effectively increased, and properly tuned turn maneuverability can be obtained.

First Modified Example

A first modified example of the mounting structure of the oscillation angle sensor will be described.

Figure 12:
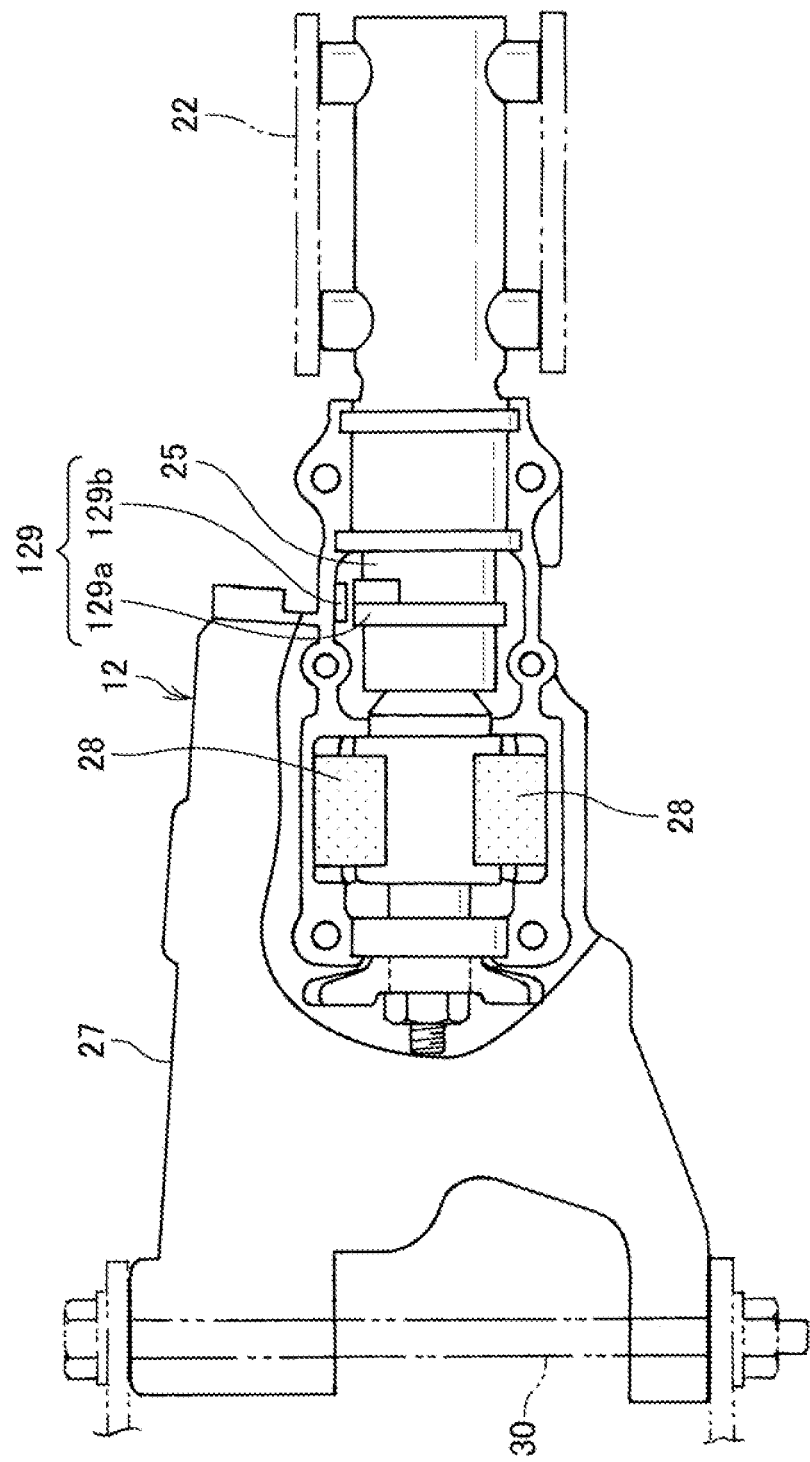
FIG. 12 is a top view where the state of mounting of the oscillation angle sensor is illustrated according to a first modified example of the first embodiment.

FIG. 12 is a top view where the state of mounting of the oscillation angle sensor 129 using the pulse generator in the first modified example of the first embodiment is illustrated.

FIG. 12 is a top view where the state of mounting of the oscillation angle sensor 129 is illustrated. In FIG. 12, part of the joint case 27 is depicted with its internal structure.

The oscillation angle sensor 129 includes a to-be-detected unit 129a fixed to the outer circumference of the oscillation shaft 25 and a detection unit 129b fixed to the inner circumference of the joint case 27. The detection unit 129b is provided on the outer side of the to-be-detected unit 129a in the radial direction of the oscillation shaft 25, and is arranged so as to face the to-be-detected unit 129a.

The detection unit 129b rotates integrally with the joint case 27, moves around the to-be-detected unit 129a to detect the to-be-detected unit 129a, and thereby detects the oscillation of the front vehicle body 10.

The to-be-detected unit 129a includes a magnetic flux generation unit formed in an annular shape with the N pole and the S pole alternately arranged in the circumferential direction. The detection unit 129b moves around the to-be-detected unit 129a to detect change in the magnetic flux, converts the change in the magnetic flux into an electrical signal, and sends it to the control device 24.

Second Modified Example

A second modified example of the mounting structure of the oscillation angle sensor will be described.

Figure 13:
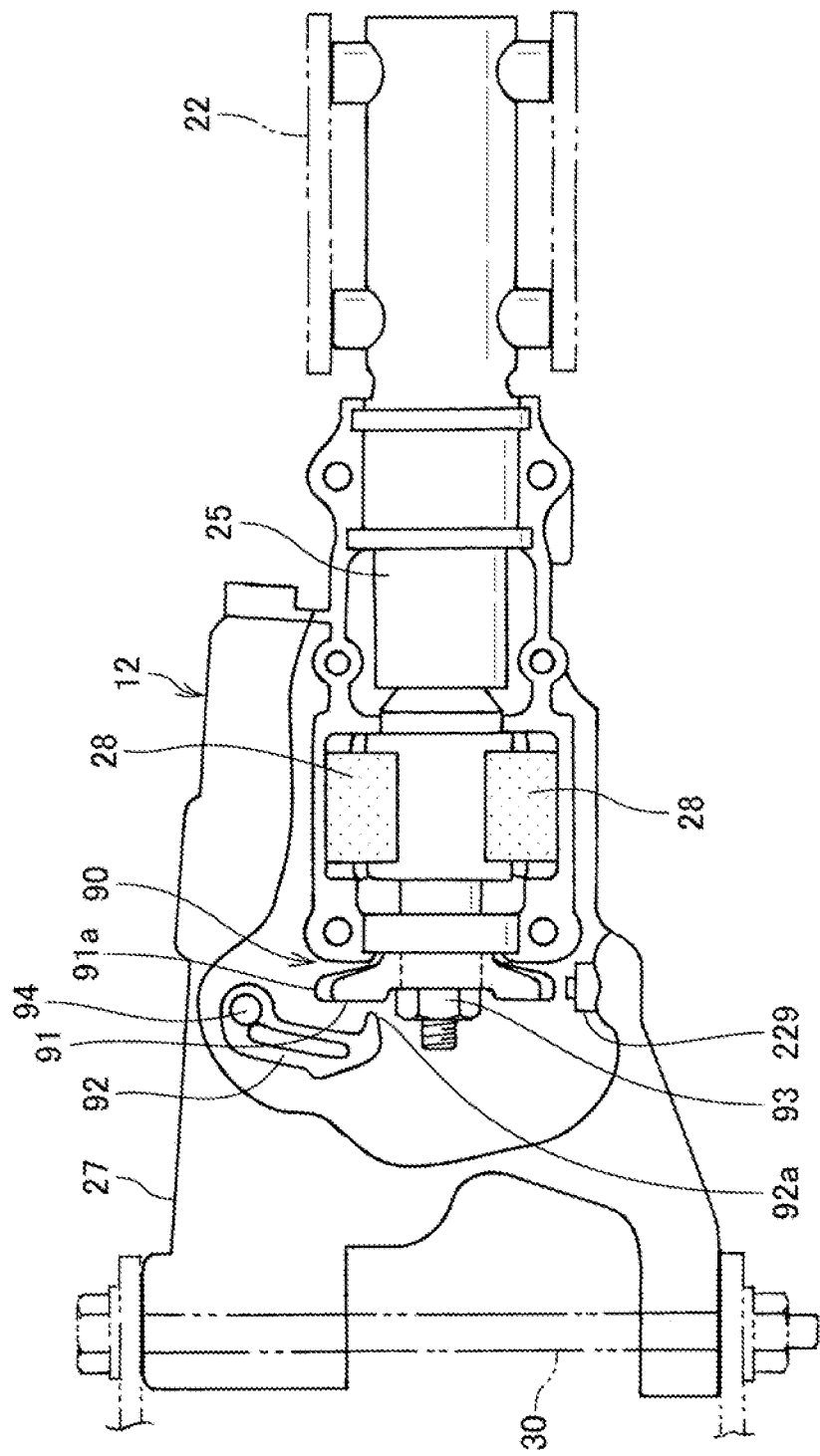
FIG. 13 is a top view where the state of mounting of the oscillation angle sensor is illustrated according to a second modified example of the first embodiment.

FIG. 13 is a top view where the state of mounting of the oscillation angle sensor 229 as a cam angle sensor is illustrated according to the second modified example of the embodiment.

The three-wheeled vehicle 1 includes an oscillation lock mechanism 90 that restricts oscillation of the front vehicle body 10.

The oscillation lock mechanism 90 includes a locking plate 91 fixed to the front end of the oscillation shaft 25 to be in one piece therewith and a locking component 92 that is brought into engagement with the locking plate 91.

The locking plate 91 is fixed to the oscillation shaft 25 by a nut 93. The locking plate 91 viewed in the direction of the axis of the oscillation shaft 25 is formed in the shape of a fan-like gear and includes a plurality of radially extending toothed sections 91a on its outer circumferential section.

The locking component 92 is swingably supported by the support shaft 94. The locking component 92 formed in a shape of an arm includes at its distal end portion an engagement section 92a that is brought into engagement with the toothed section 91a. The locking component 92 in a normal state is not in engagement with the locking plate 91.

When the rider or the like operates the oscillation lock mechanism 90 via an operation unit (not-shown), the locking component 92 oscillates about the support shaft 94 and is brought into engagement with the toothed section 91a of the locking plate 91. By virtue of this, oscillation of the front vehicle body 10 is restricted.

The oscillation angle sensor (cam angle sensor) 229 is fixed to the inner surface of the joint case 27 and rotates integrally with the joint case 27. The oscillation angle sensor 229 is arranged so as to face the toothed section 91a of the locking plate 91 from the outer circumference side. In other words, the toothed section 91a of the locking plate 91 is used as a cam pulser.

The oscillation angle sensor 229 moves around the toothed section 91a in response to the rotation of the joint case 27 to sense the toothed section 91a, and thereby senses oscillation of the front vehicle body 10.

The oscillation angle sensor 229 is, for example, a pickup coil, and detects the oscillation of the front vehicle body 10 based on the change in the magnetic flux due to the unevenness of the plurality of toothed sections 91a.

It should be noted that the above-described first embodiment only illustrates a mode of implementation of the present invention and the present invention is not limited to the above-described first embodiment.

In the above-described first embodiment, explanations have been provided on the assumption that the control device 24 controls the rotational force of the outer wheel and the rotational force of the inner wheel such that they are equal to each other in the case where the oscillation angle θ is not larger than the oscillation angle θ1, to which the present invention is not limited. The control device 24 may control the left motor 23L and the right motor 23R such that the rotational force of the outer wheel and the rotational force of the inner wheel are made equal to each other in a case where the change in the oscillation angular velocity of the oscillation of the three-wheeled vehicle 1 is larger than the predetermined frequency. According to this feature, in a case where the three-wheeled vehicle 1 oscillates to the left and right with a relatively large frequency due to the unevenness of the road surface or the like, the rotational force of the outer wheel and the rotational force of the inner wheel become equal to each other. As a result, it is made possible to prevent the rotational force of the outer wheel and the rotational force of the inner wheel from being controlled to be different than each other in unnecessary cases.

The oscillation-type vehicle according to the present invention is not limited to the three-wheeled vehicle 1 which has been described as a mode of implementation of the above-described first embodiment. For example, the rear wheel may have left and right suspension mechanisms functioning independently from each other.

Also, in the above-described first embodiment, explanations have been provided on the assumption that the propensity P is specified to be smaller in the high speed range than in the low to medium speed range, but the propensity P may not be made smaller in the high speed range and instead it may have a high turn maneuverability, and it suffices that the propensity P is allowed to be appropriately specified according to the vehicle speed V in accordance with the characteristics of the vehicle.

It should be noted that, in the above-described first embodiment, an example has been illustrated where the high speed range is 60 km/h or more, to which the present invention is not limited. For example, in a case where the rear vehicle body is more stable as in the case of the oscillation vehicle having a relatively wide wheel distance L between the left and right rear wheels, the high speed range may be defined as a much higher speed range, and it suffices that appropriate enhancement of the turning force depending on the vehicle speed V be implemented according to the characteristics of the vehicle, taking into account the agility at the time of turn maneuvering and the stability of attitude.

Also, the propensity P may be specified according to the skill of the rider. For example, through learning of the driving history by the control device 24 or the like, or according to the determination using artificial intelligence (AI), the propensity P may be specified as a larger value when it has been determined that the driving skill is at or above a predetermined level to increase the turn maneuverability.

Second Embodiment

A second embodiment in which the present invention is implemented will be described hereinbelow with reference to FIGS. 14 to 17. In the second embodiment, the components and portions configured in the same manner as in the above-described first embodiment are given the same reference signs and descriptions thereof will be omitted.

Traditionally, a known oscillation-type vehicle includes a front vehicle body that suspends a front wheel in a steerable manner, a rear vehicle body that suspends left and right rear electric drive wheels, and an oscillation mechanism that causes the front vehicle body and the rear vehicle body to oscillate relative to each other (for example, see Patent Literature 6 (Japanese Patent Application Laid-Open No. 2012-101702)). In Patent Literature 6, a battery for drive wheels are provided in the rear vehicle body, and a drive unit that has a differential gear and an axle is provided between the left and right drive wheels in the rear vehicle body. Even when it is attempted to reduce the size of the rear vehicle body, the above-described drive unit and motor occupy a predetermined space between the left and right drive wheels, so that reduction in the size is difficult as long as the battery volume is not reduced. Also, in Patent Literature 6, the above-described drive unit is accommodated in the motor unit which accommodates the motor, and the battery case which accommodates the battery is fixed to the upper portion of the motor unit as a case different than the motor unit. Further, the oscillation mechanism is fixed to the motor unit via a hanger plate. As a result, the battery case, which is a relatively heavy component, resides above the motor unit to which the oscillation mechanism is fixed. In this configuration, there are limitations to attempts to make the battery which is a heavy component closer to the oscillation shaft of the oscillation mechanism so as to maintain the safety of the rear vehicle body in view of the need for reduction in the size of a vehicle in a case where the interval between the left and right drive wheels should be reduced or in any other relevant cases. Further, among three-wheeled oscillation-type vehicles, a three-wheeled oscillation-type vehicle is known which drives left and right rear wheels by an in-wheel motor (for example, see Patent Literature 7 (Japanese Patent Application Laid-Open No. 2005-193715)). In Patent Literature 7, the left and right rear wheels are suspended using a double wishbone structure, and the left and right suspension mechanisms are coupled by a buffer to thereby configure an oscillation mechanism. In this oscillation mechanism, the battery is arranged above the double wishbone structure so as to avoid the double wishbone structure.

In this structure, although there is no drive unit that couples left and right elements such as a differential gear, the oscillation mechanism is bulky and accordingly the battery volume is limited, which makes it difficult to arrange the battery at a lower position.

It should be noted that, amongst stand-on type lawn mowers, a lawn mower is known which arranges its battery between left and right drive wheels (for example, see Patent Literature 8 (Japanese Patent Application Laid-Open No. 2015-63237)).

Also, among the same lawn mowers, a lawn mower is known which independently includes left and right motors in a battery case for left and right drive wheels, respectively (for example, see Patent Literature 9 (Japanese Patent Application Laid-Open No. 2008-265685)).

Meanwhile, among electric wheelchairs, a configuration is known according to which a battery stopper that has been removed is used as a slope-like guide for attachment and detachment of a battery (for example, see Patent Literature 10 (Japanese Patent Application Laid-Open No. 2005-198711)). However, those that are described in Patent Literatures 8, 9, and 10 do not include a suspension device that includes an oscillation mechanism and a buffer mechanism, failing to provide an oscillation mechanism to accommodate to the cruising speed on public roads to enhance the maneuverability at the time of turn maneuvering as in an oscillation three wheeler for passenger or a buffer mechanism that ensures ride comfort for passengers, so that suggestions cannot be derived from them in relation to effective arrangement in the oscillation three wheeler.

In view of the above-described circumstance, it is desirable that the battery and the motor are efficiently arranged in an oscillation-type vehicle and that the oscillation mechanism can be efficiently fixed to the rear vehicle body. For example, even in a case where reduction in size should be ensured and the space in the rear vehicle body is limited, it is desirable to achieve a configuration of a rear vehicle body of an oscillation electric vehicle which can demonstrate the optimum space efficiency while ensuring maneuverability and comfort specific to the oscillation electric vehicle.

Figure 14:
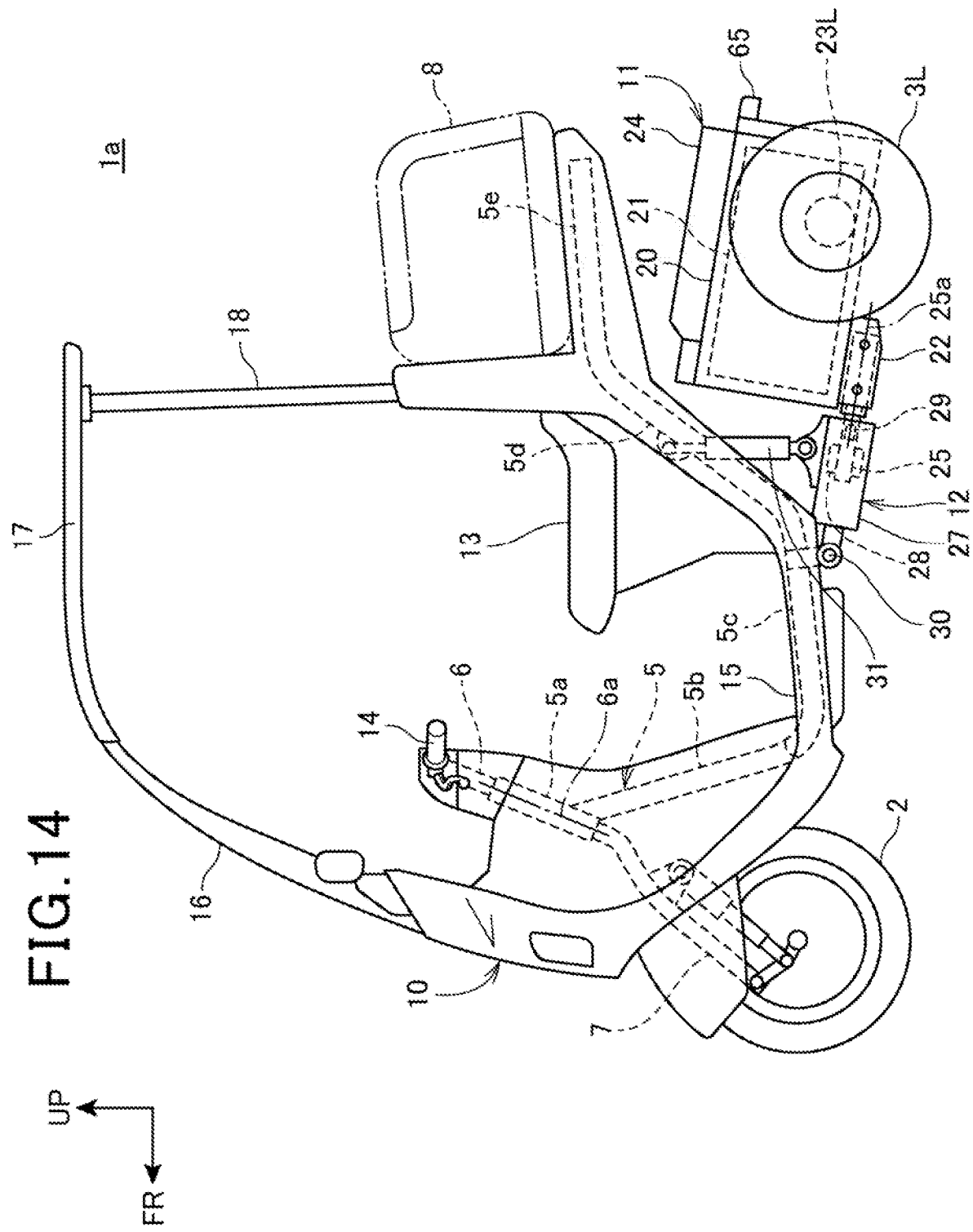
FIG. 14 is a left side view of the three-wheeled vehicle according to a second embodiment of the present invention.
Figure 15:
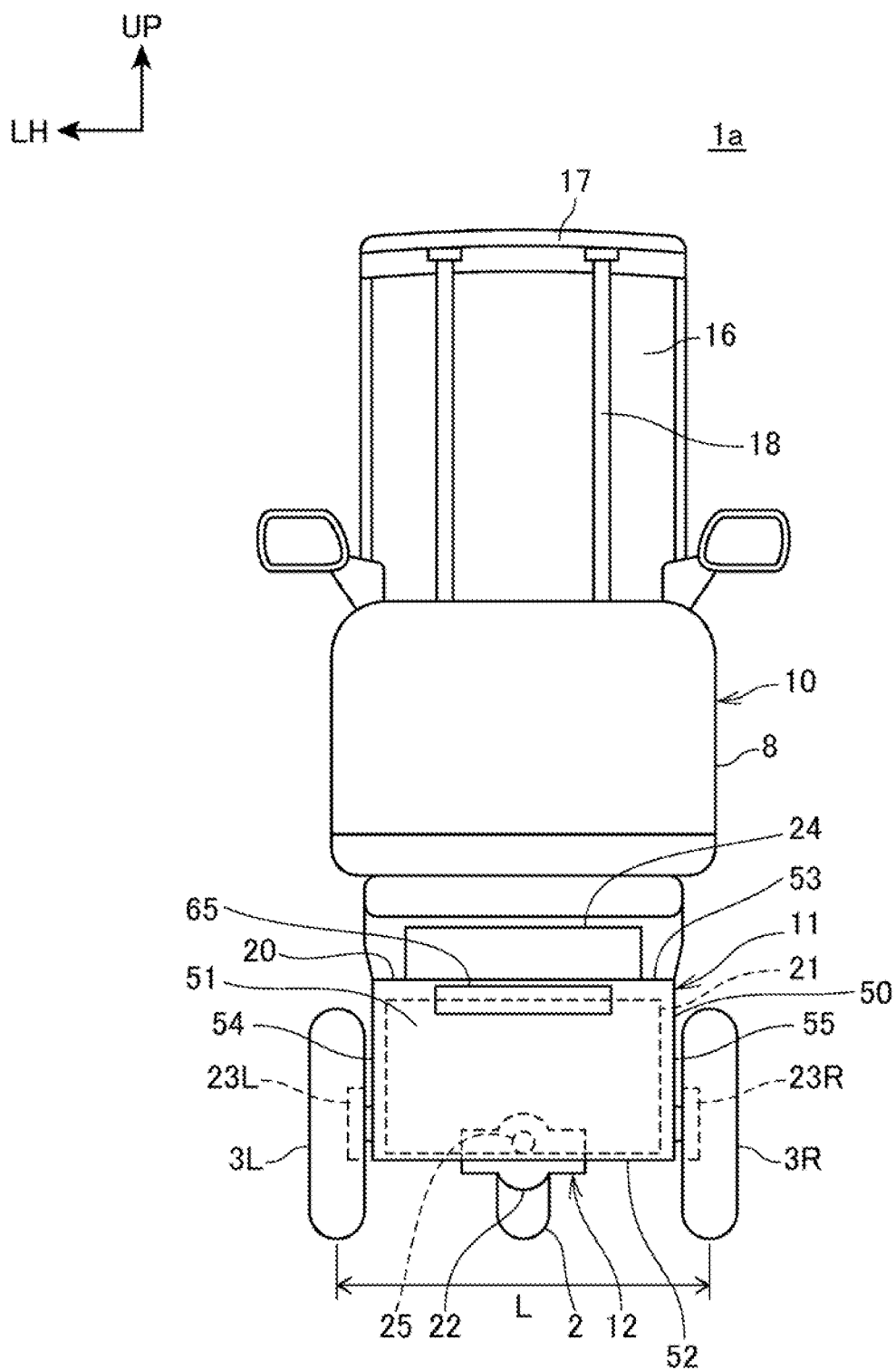
FIG. 15 is a rear view of the three-wheeled vehicle.

FIG. 14 is a left side view of the three-wheeled vehicle 1a according to the second embodiment of the present invention. FIG. 15 is a rear view of the three-wheeled vehicle 1a.

The three-wheeled vehicle 1a is a vehicle configured in the same manner as in the above-described first embodiment and includes a front vehicle body 10, a rear vehicle body 11 that suspends a pair of rear wheels (left and right rear wheels) 3L and 3R (drive wheels), and an oscillation mechanism 12.

The rear vehicle body 11 is arranged on the rear side of the rear frame 5d and below the luggage rack frame 5e.

The rear vehicle body 11 includes a battery case 20, a battery 21, a left motor 23L (motor) that drives the left rear wheel 3L, a right motor 23R (motor) that drives the right rear wheel 3R, and a control device 24.

The battery case 20 is formed in the shape of a box in a substantially cuboid shape elongated in the front and back direction and is formed in a substantially rectangular shape in vehicle's side view. The battery 21 is accommodated in the battery case 20. The battery 21 is formed in a substantially cuboid block shape elongated in the front and back direction.

Figure 16:
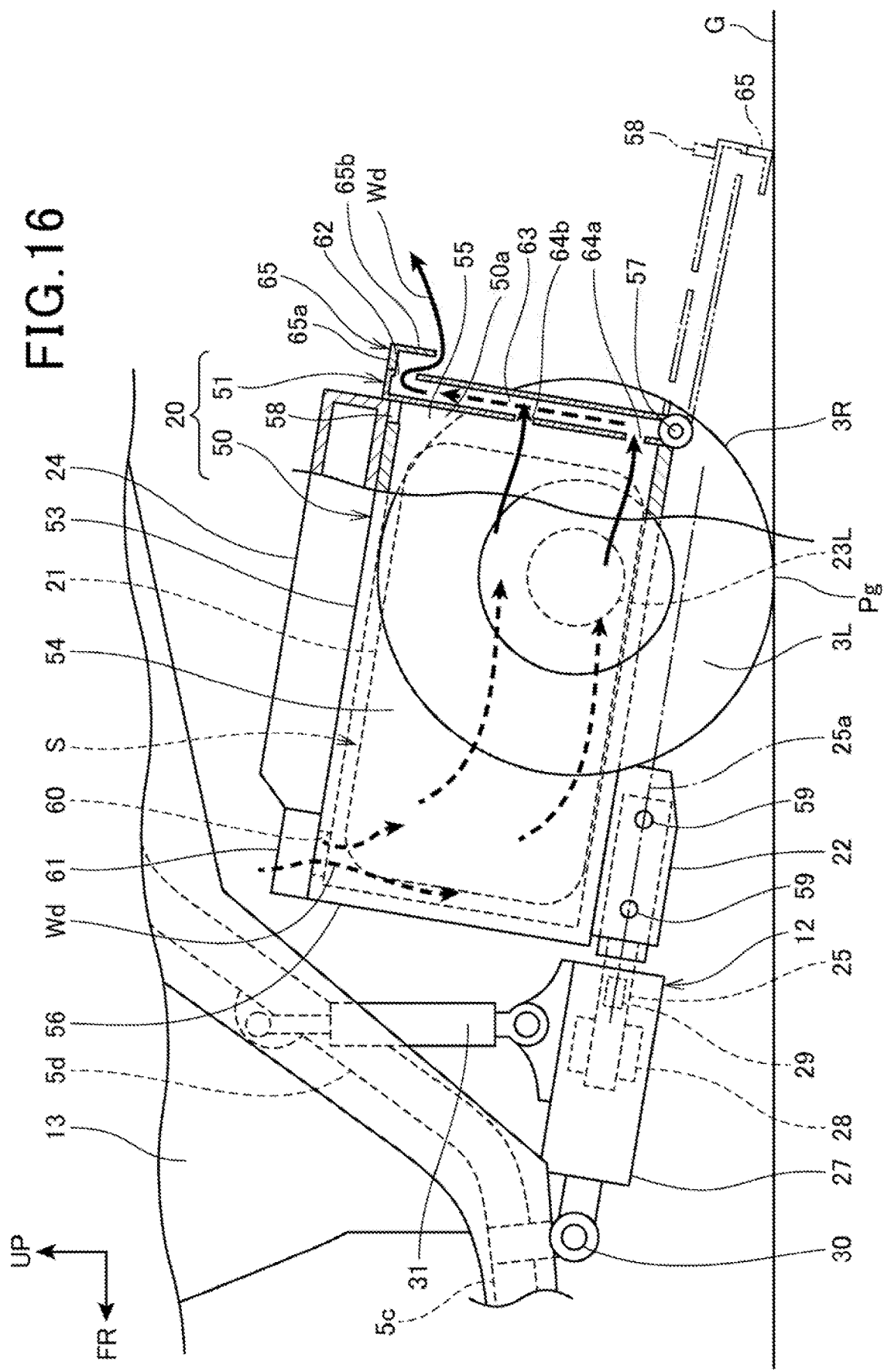
FIG. 16 is a left side view of a peripheral portion of the rear vehicle body.
Figure 17:
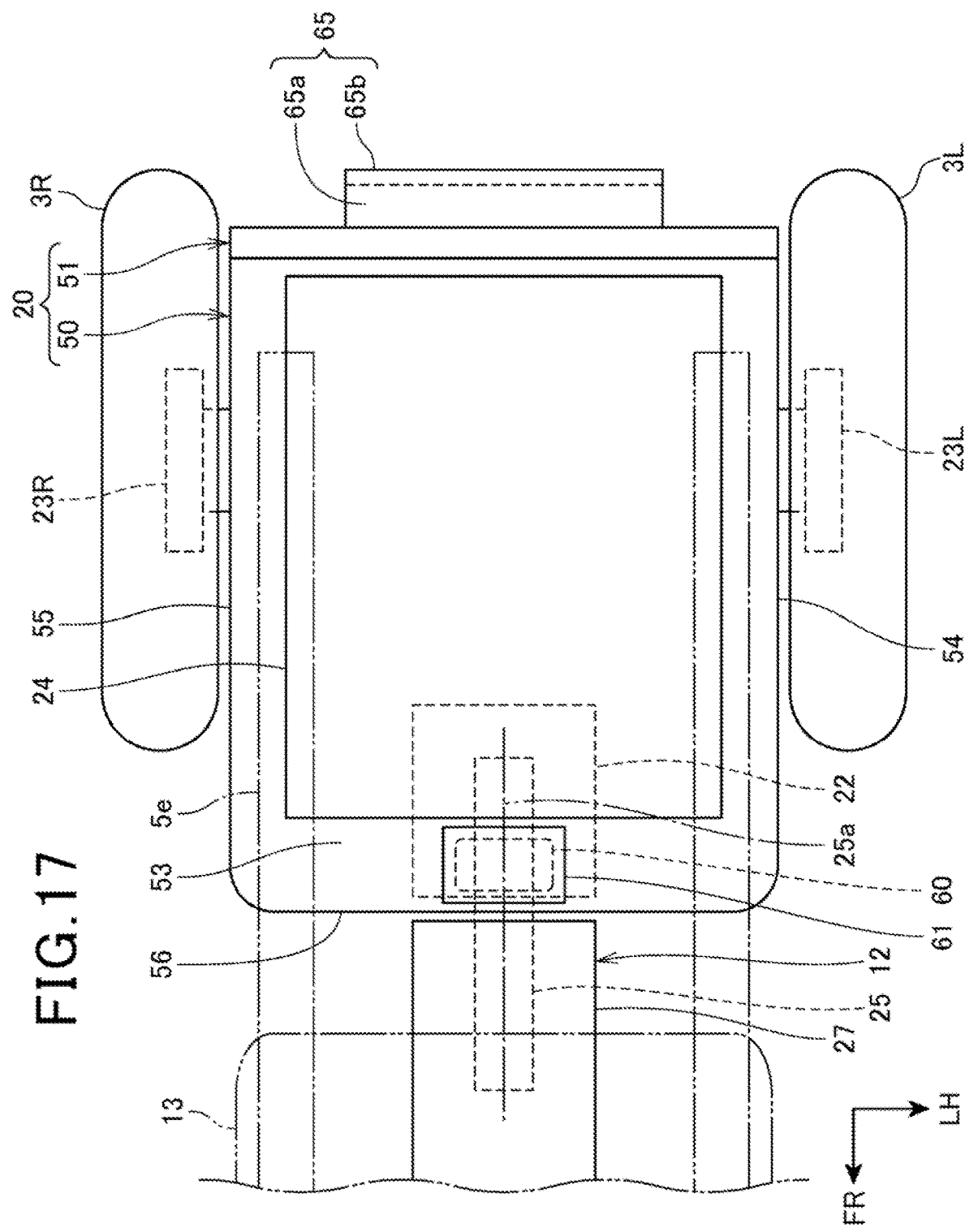
FIG. 17 is a top view of the peripheral portion of the rear vehicle body.

FIG. 16 is a left side view of a peripheral portion of the rear vehicle body 11. FIG. 17 is a top view of the peripheral portion of the rear vehicle body 11. Here, in FIG. 16, the rear end of the rear vehicle body 11 is depicted as a cross section.

Referring to FIGS. 15 to 17, the battery case 20 includes a case body 50 whose rear surface is opened, and a lid member 51 (slope component) that covers the attachment and detachment opening 50a on the rear surface of the case body 50 so that the opening 50a can be opened and closed.

The case body 50 includes a lower wall section 52 (lower surface) defining the bottom surface of the box shape, an upper wall section 53 facing the lower wall section 52, left and right side wall sections 54 and 55 (side surfaces) connecting the lower wall section 52 to the upper wall section 53, and a front wall section 56 facing the lid member 51, where these sections are provided in one piece with each other.

The attachment and detachment opening 50a is formed in the entire surface of the rear surface of the case body 50 and is formed in a substantially rectangular shape in its rear view.

The lid member 51 is a substantially rectangular plate member that covers the attachment and detachment opening 50a from the rear side. The lid member 51 is connected to the rear end of the lower wall section 52 of the case body 50 via the hinge 57 provided in the lower end portion.

An engagement section 58 that is brought into engagement with the rear end of the upper wall section 53 of the case body 50 is provided in the inner surface of the upper end of the lid member 51.

The lid member 51 is opened and closed by being rotated forward and backward about the hinge 57. When the lid member 51 is rotated backward and opened, the attachment and detachment opening 50a is exposed to the rear side. The battery 21 is inserted into and taken out of the storage space S in the case body 50 via the attachment and detachment opening 50a.

The left motor 23L is fixed to the rear portion of the left side wall section 54 of the battery case 20 with the motor shaft placed in an orientation to be directed to the vehicle width direction (left and right direction). The left motor 23L is an in-wheel motor that directly drives the left rear wheel 3L and is arranged on the inner circumferential side of the wheel portion of the rear wheel 3L. The outer end of the left motor 23L protrudes to the outside in the vehicle width direction via the side wall section 54.

The right motor 23R is fixed to the rear portion of the right side wall section 55 of the battery case 20 with the motor shaft placed in an orientation to be directed in the vehicle width direction. The right motor 23R is an in-wheel motor that directly drives the right rear wheel 3R and is arranged on the inner circumferential side of the wheel portion of the rear wheel 3R. The outer end of the right motor 23R protrudes to the outside in the vehicle width direction from the side wall section 55.

The control device 24 is fixed to the upper surface of the upper wall section 53 of the battery case 20. The control device 24 is formed in a box shape having a small height and elongated in the front-rear direction. The control device 24 electrically controls the operations of the left motor 23L, the right motor 23R, and the battery 21.

The oscillation mechanism 12 includes a joint case 27 that is coupled to the rear portion of the lower frame 5c of the front vehicle body 10 so as to be swingable upward and downward, an oscillation shaft 25 inserted into the cylinder of the joint case 27 from the rear side, a bracket 22 that secures the oscillation shaft 25 to the rear vehicle body 11; and an elastic member 28 provided between the joint case 27 and the oscillation shaft 25.

The oscillation mechanism 12 is a damper device configured by a typical Neidhart mechanism.

More specifically, oscillation shaft 25 is fixed to the lower surface of the front portion of the lower wall section 52 of the case body 50 via the bracket 22, and extended forward from the lower portion of the front portion of the case body 50 in the vehicle's side view.

The bracket 22 is provided in the lower surface of the lower wall section 52. The oscillation shaft 25 is fixed by a bolt 59 (FIG. 16) inserted into the bracket 22 in the vehicle width direction.

The rear portion of the oscillation shaft 25 is supported by the bracket 22. The front portion of the oscillation shaft 25 is extended forward relative to the front wall section 56 of the case body 50 and is inserted into the joint case 27.

The oscillation shaft 25 is rotatable relative to the joint case 27 inside the joint case 27. The elastic member 28 is provided between the inner circumferential section of the cylindrical joint case 27 and a pressing section provided on the outer circumferential section of the oscillation shaft 25. The elastic member 28 is for example formed of rubber. When the oscillation shaft 25 rotates relative to the joint case 27, the elastic member 28 is compressed in the circumferential direction between the joint case 27 and the oscillation shaft 25.

The oscillation shaft 25 is positioned at the center in the width of the vehicle in the same manner as the front wheel 2. The axis 25a of the oscillation shaft 25 is not horizontal but slightly inclined rearward and downward in the vehicle's side view. It should be noted that the inclination of the oscillation shaft 25 is defined such that the extended line of the axis 25a is close to the point of contact with the ground Pg of the rear wheels 3L and 3R, and the rear vehicle body 11 is more readily stabilized in the presence of oscillation of the front vehicle body 10 even in the case of a small oscillation vehicle whose wheel distance L between the rear wheels 3L and 3R is relatively small.

The rear wheels 3L and 3R are arranged on the left side and the right side, respectively, at equal spaces with reference to the center in the width of the vehicle. The wheel distance L between the left rear wheel 3L and the right rear wheel 3R corresponds to the distance between the center in the width direction of the rear wheel 3L and the center in the width direction of the rear wheel 3R.

The front vehicle body 10 is configured to be capable of oscillating to the left and right about the oscillation shaft 25 relative to the rear vehicle body 11 in a state where the rear wheels 3L and 3R are in contact with the ground, and the camber angle of the rear wheels 3L and 3R is 0° even at the time of the oscillation. When the front vehicle body 10 oscillates to the left and to the right, the joint case 27 rotates relative to the oscillation shaft 25 fixed to the rear vehicle body 11.

Specifically, the three-wheeled vehicle 1a is a saddle-style oscillation-type three-wheeled vehicle whose front vehicle body 10 can oscillate to the left and right relative to the rear vehicle body 11 at the time of turn maneuvering. When the front vehicle body 10 oscillates to the left and right, a reaction force in the return direction against the oscillation is generated against the compression of the elastic member 28 in the above-mentioned Neidhart mechanism.

The three-wheeled vehicle 1a includes an oscillation angle sensor 29 (angle sensor) that senses leftward and rightward oscillations of the front vehicle body 10. The oscillation angle sensor 29 is provided on the oscillation shaft 25 of the oscillation mechanism 12, and senses the angle of the relative rotation of the oscillation shaft 25 relative to the joint case 27. The angle of the relative rotation of the oscillation shaft 25 relative to the joint case 27 corresponds to the oscillation angle in the vertical direction of the front vehicle body 10. The oscillation angle sensor 29 is, for example, a potentiometer.

The front end of the joint case 27 is coupled to the rear end of the lower frame 5c of the front vehicle body 10 via a pivot shaft 30 extending in the vehicle width direction. The joint case 27 is capable of swinging upward and downward about the pivot shaft 30. Also, the rear vehicle body 11 is coupled to the front vehicle body 10 via the suspension 31 (buffer mechanism) extending upward and downward. One end of the suspension 31 is coupled to the rear frame 5d and the other end of the suspension 31 is coupled to the upper surface portion of the joint case 27.

In other words, the rear vehicle body 11 is provided so as to be swingable upward and downward via the pivot shaft 30 relative to the front vehicle body 10.

The battery case 20 includes an air introduction port 60 (FIG. 4) at the front end of the upper wall section 53, where the air introduction port 60 extends through the upper wall section 53. The air introduction port 60 allows the storage space S to be in communication with the outside.

A blower fan 61 is provided in the upper wall section 53 of the battery case 20 such that it covers the air introduction port 60 from above. The air introduction port 60 and the blower fan 61 are positioned on the front side of the control device 24 on the upper surface of the upper wall section 53 and are positioned at the center in the width of the vehicle.

The battery case 20 includes an air discharge port 62 (FIG. 16) that allows the storage space S to be in communication with the outside on the rear side, where the air discharge port 62 is included in the lid member 51.

Also, the lid member 51 includes an air introduction passage 63 (air guide section) extending in up and down direction through the thickness thereof. Further, the lid member 51 includes, in its front surface, air passage ports 64a and 64b that allow the storage space S to be in communication with the air introduction passage 63. Multiple air passage ports 64a and 64b are provided and aligned in the up and down direction. The air passage port 64a is provided at a lower portion of the lid member 51 and the air passage port 64b is provided at an intermediate portion in the up and down direction of the lid member 51.

The air discharge port 62 is provided at an upper end of the rear surface of the lid member 51, and allows the upper end of the air introduction passage 63 to be in communication with the outside on the rear side. The air discharge port 62 is positioned above the air passage ports 64a and 64b.

The air Wd around the battery case 20 is introduced via the air introduction port 60 to the upper portion of the front section of the storage space S by the rotation of the blower fan 61. The air Wd (cooling air) that has flown into the storage space S passes through the cooling air passage between the inner surface of the battery case 20 and the battery 21 so as to cool the battery 21. The air Wd that has cooled the battery 21 flows from the air passage ports 64a and 64b into the air introduction passage 63 of the lid member 51 and is discharged from the air discharge port 62 to the outside.

In this manner, since the air introduction passage 63 is provided in the lid member 51, a dedicated air guide member does not need to be provided and the number of the components can be reduced.

It should be noted that blowing winds during the traveling may be introduced into the storage space S from the air introduction port 60 without providing the blower fan 61.

A grip portion 65 that can be grasped by an operator or the like when opening and closing the lid member 51 is provided on the rear surface of the upper end of the lid member 51.

The grip portion 65 is provided above the air discharge port 62. The grip portion 65 is formed in a strip-like shape elongated in the vehicle width direction.

More specifically, the grip portion 65 includes a rearward extended section 65a extending rearward from a position above the air discharge port 62 in the rear surface of the lid member 51 and a lower extended section 65b bent at the rear end of the rearward extended section 65a and extending downward, and formed so as to have a substantially L-shaped cross section.

The operator can put his/her hand into the space between the rear surface of the lid member 51 and the lower extended section 65b and grasp the grip portion 65, and the grip portion 65 can be properly grasped.

The rearward extended section 65a and the lower extended section 65b of the grip portion 65 cover the air discharge port 62 from above and from behind, and function as a visor for the air discharge port 62. As a result, it is made possible to effectively suppress intrusion of foreign matters such as rain water and dust into the air discharge port 62. Also, since the air discharge port 62 is hidden by the grip portion 65, the three-wheeled vehicle 1a has an excellent appearance.

The oscillation shaft 25 of the oscillation mechanism 12 is provided substantially in parallel with the lower wall section 52 of the battery case 20. The oscillation shaft 25 is provided so as to extend downward to the rear side in the vehicle's side view, and the battery case 20 is also arranged with inclination so as to be downward to the rear side along the oscillation shaft 25. As a result, the lower wall section 52 and the upper wall section 53 of the battery case 20 extend downward toward the rear side. Since the battery case 20 extends downward toward the rear side, the battery 21 which is a relatively heavy component will be closer to the point of contact with the ground Pg of the rear wheels 3L and 3R, and facilitates stabilization of the rear vehicle body 11 in cooperation with the inclination of the aforementioned oscillation shaft 25.

When the lid member 51 is rotated rearward and opened, the grip portion 65 is brought into contact with the ground surface G as indicated by the virtual line in FIG. 16 and thus the position thereof is determined, and is placed in the state of inclination downward to the rear side in the vehicle's side view. Specifically, the lid member 51 is a slope component that forms a slope that extends downward from the rear end of the lower wall section 52 of the battery case 20 to the side of the ground surface G.

In the state where the lid member 51 is positioned by the grip portion 65, the inclination of the lower wall section 52 of the battery case 20 and the inclination of the lid member 51 define substantially the same inclination, so that the lower wall section 52 and the lid member 51 form a slope continuous to the front side and the rear side.

The operator can insert and remove the battery 21 into and from the battery case 20 by making the battery 21 slid on the slope formed by the lower wall section 52 and the lid member 51. As a result, insertion and removal of the battery 21 is facilitated In the second embodiment, the left motor 23L and the right motor 23R, which are in-wheel motors, are supported by the left and right side wall sections 54 and 55, respectively, of the battery case 20, so that the size of the storage space S can be increased in the vehicle width direction and a large battery 21 can be accommodated in the storage space S.

The battery case 20 also functions as a frame component that supports the battery 21, the right motor 23R, the left motor 23L, the rear wheels 3L and 3R, and the control device 24, so that the it is formed of a high-strength material and depending on the size of the battery 21, for example, as in a small oscillation electric vehicle (three-wheeled vehicle) 1a, in a vehicle in which the size and dimensions of the rear vehicle body 11 are limited, the battery case 20 is formed in an appropriate size enabling maximum use of the space and the accommodation by the second embodiment. In addition, since the oscillation shaft 25 of the oscillation mechanism 12 is fixed to the lower wall section 52 of the battery case 20 formed so as to have high strength such that the oscillation shaft 25 overlaps the lower wall section 52 in the top view while ensuring sufficient length of the oscillation mechanism 12, as a vehicle, the front-to-rear length can be efficiently downsized, in addition to which the oscillation shaft 25 can be provided at a position close to the point of contact with the ground Pg of the rear wheels 3L and 3R, so that it is made possible to obtain oscillation capability with high maneuverability. Further, since the battery 21 and the oscillation mechanism 12 can be arranged so as to be close to each other, the rear vehicle body 11 which is a non-oscillating section can be readily stabilized. Even in a small oscillation vehicle having a relatively narrow width between left and right rear wheels 3L and 3R, since the rear vehicle body 11 is stable, it is made possible to enhance the turning maneuverability by controlling the driving forces of the left and right rear wheels 3L and 3R independently from each other even when the camber angle of the drive wheel is 0. Specifically, when the rear vehicle body 11 is stable, for example, in a case where the oscillation angular velocity of the front vehicle body 10 is high, the control device 24 determines that the rider has the intention to make an agile turn, making it possible to implement control such that the increase in the speed on the outer wheel side of the rear wheels 3L and 3R at the initial stage of the turn maneuvering is made higher than in normal turning.

As has been described in the foregoing, according to the second embodiment in which the present invention is implemented, the three-wheeled vehicle 1a includes the front vehicle body 10 that suspends the front wheel 2 in a steerable manner, the rear vehicle body 11 that suspends the rear wheels 3L and 3R, which are the left and right electric drive wheels, and the oscillation mechanism 12 that causes the front vehicle body 10 and the rear vehicle body 11 to oscillate relative to each other, the battery case 20 that accommodates the battery 21 which supplies currents to the side of the rear wheels 3L and 3R is arranged in the rear vehicle body 11, the left motor 23L and the right motor 23R that drive the left and right rear wheels 3L and 3R are provided in the left and right side wall sections 54 and 55 of the battery case 20, respectively, and the oscillation mechanism 12 is fixed to the battery case 20. According to these features, the left motor 23L and the right motor 23R can be efficiently arranged in the left and right side wall sections 54 and 55 of the battery case 20 near the rear wheels 3L and 3R, a large storage space S can be ensured inside the battery case 20, and the battery 21 can be efficiently arranged. Also, the oscillation mechanism 12 can be efficiently fixed using the battery case 20.

Also, the oscillation mechanism 12 is fixed to the lower wall section 52 of the battery case 20. By virtue of this, since the oscillation mechanism 12 can be fixed using the space below the lower wall section 52, the oscillation mechanism 12 can be arranged in the front and rear direction in a compact manner, and the longitudinal length of the three-wheeled vehicle 1a can be suppressed. Also, the oscillation mechanism 12 can be arranged at a lower position close to the point of contact with the ground of the rear wheels 3L and 3R, the three-wheeled vehicle 1a can oscillate effectively, and it is made possible to provide a small oscillation-type electric vehicle having high maneuverability.

Also, the oscillation mechanism 12 has the oscillation shaft 25 that extends in the back-and-forth direction, the oscillation shaft 25 is arranged so as to extend downward to the rear side, and the battery case 20 is inclined downward to the rear side along the oscillation shaft 25. According to this feature, the rear extended line of the oscillation shaft 25 is oriented in the direction toward the point of contact with the ground Pg of the rear wheels 3L and 3R which are the drive wheels, and the battery 21 which is a relatively heavy component is close to the point of contact with the ground Pg of the drive wheel, which leads to a low-center-of-gravity arrangement of the battery 21, so that the rear vehicle body 11 which is a non-oscillating section is more readily stabilized. By virtue of this, for example, control of the driving force distribution such that the speed of the outer wheel side of the left and right rear wheels 3L and 3R of the rear vehicle body 11 is increased can be achieved so that the oscillation-type vehicle 1 make a turn in an agile manner even in the case of a small oscillation vehicle having a relatively narrow width between the left and right rear wheels 3L and 3R of the rear vehicle body 11. In other words, it is made possible to provide a small oscillation-type electric vehicle having high maneuverability.

Further, the suspension 31 is provided between the oscillation mechanism 12 and the front vehicle body 10. By virtue of this, the suspension 31 can be efficiently arranged using the space between the oscillation mechanism 12 and the front vehicle body 10.

Also, the battery case 20 includes, in its rear surface, the attachment and detachment opening 50a into and from which the battery 21 can be inserted and removed. By virtue of this, the battery 21 can be readily inserted into and removed from the battery case 20 according to the inclination of the battery case 20 via the attachment and detachment opening 50a.

Also, the battery case 20 includes the lid member 51 as a slope component that extends from the attachment and detachment opening 50a to the outside. By virtue of this, since the battery can be supported by the lid member 51, the battery 21 can be readily inserted into and removed from the battery case 20.

Also, the inclination of the lid member 51 is continuous to the inclination of the battery case 20. By virtue of this, the battery 21 can be made to move continuously along the battery case 20 and the lid member 51 and the battery 21 can be readily inserted into and removed from the battery case 20.

Further, the slope component is the lid member 51 that covers the attachment and detachment opening 50*a* so that the opening 50*a* can be opened and closed. By virtue of this, it is made possible to achieve a configuration that facilitates insertion and removal of the battery 21 without the need of increasing the number of components.

Also, the lid member 51 includes the grip portion 65 that can be grasped at the time of opening and closing and, when the lid member 51 is opened and the grip portion 65 is brought into contact with the ground, then the inclination of the lid member 51 will be established. By virtue of this, it is made possible to establish the inclination of the lid member 51 using the grip portion 65 and the number of components can be reduced.

Also, the battery case 20 includes, inside the battery case 20, the air introduction port 60 that guides the cooling air and the air discharge port 62 provided on the rear side of the air introduction port 60, and the lid member 51 includes the air discharge port 62 and the air introduction passage 63 that guides the cooling air to the air discharge port 62. By virtue of this, since the cooling air can be guided into the air discharge port 62 by the air introduction passage 63 of the lid member 51, a dedicated air guide member does not need to be provided and the number of components can be reduced.

Also, the grip portion 65 of the lid member 51 also serves as a visor for the air discharge port 62. By virtue of this, a dedicated visor does not need to be provided for the air discharge port 62 and the number of components can be reduced.

It should be noted that, in the second embodiment as well, as has been described with reference to FIGS. 3 to 10, it will be appreciated that drive control may be implemented such that the rear wheels 3L and 3R are independently controlled according to oscillation using the oscillation angle θ which is the information on oscillation and the vehicle speed V. Also, in the second embodiment, the structures of the first modified example and the second modified example of FIGS. 12 and 13 may be adopted.

REFERENCE SIGNS LIST

1: three-wheeled vehicle (oscillation-type vehicle)
2: front wheel
3L, 3R: rear wheel (drive wheel)
10: front vehicle body
11: rear vehicle body
12: oscillation mechanism (Neidhart mechanism)
25: oscillation shaft
29: oscillation angle sensor (angle sensor)
L: wheel distance
P1, P2: propensity
T: theoretical value
V: vehicle speed (speed of vehicle)
θ: oscillation angle (information on oscillation)
θ1: oscillation angle (predetermined angle, reference oscillation angle)
Vo/Vi: inner/outer wheel speed ratio

The invention claimed is:

1. A vehicle comprising:
a processor,
a front vehicle body that suspends a front wheel in a steerable manner;
a rear vehicle body that suspends left and right drive wheels; and
an oscillation mechanism that causes the front vehicle body and the rear vehicle body to oscillate relative to each other, the processor carries out drive control of the left and right drive wheels such that the drive wheels behave differently from each other in response to oscillation of the vehicle, wherein
the processor carries out the drive control of the left and right drive wheels using information on the oscillation and information on a speed of vehicle,
the drive control includes determining propensities causing increase in a rotational force of an outer wheel of the left and right drive wheels relative to a rotational force of an inner wheel at the time of turn maneuvering with oscillation in response to a propensity of increase in an oscillation angle according to the information on the oscillation, and
when a change in an oscillation angular velocity of oscillation according to the information on the oscillation is larger than a predetermined frequency, the processor controls the rotational force of the outer wheel and the rotational force of the inner wheel to be equal to each other.

2. The vehicle according to claim 1, wherein the information on the oscillation is detected on an oscillation shaft of the oscillation mechanism.

3. The vehicle according to claim 2, wherein the oscillation mechanism is a Neidhart mechanism, and the information on the oscillation is sensing information of an angle sensor provided on the oscillation shaft of the Neidhart mechanism.

4. The vehicle according to claim 1, wherein the propensities causing the increase in the rotational force of the outer wheel relative to the rotational force of the inner wheel vary depending on the speed of vehicle.

5. The vehicle according to claim 1, wherein, when the oscillation angle according to the information on the oscillation is equal to or smaller than a predetermined angle, the rotational force of the outer wheel and the rotational force of the inner wheel are controlled to be equal to each other.

6. The vehicle according to claim 1, wherein the drive control includes driving the drive wheels such that an inner/outer wheel speed ratio, which is a ratio of an actual speed of an outer wheel to an actual speed of an inner wheel, becomes larger than a theoretical value, which is a ratio of a speed of the outer wheel to a speed of the inner wheel and is estimated from an oscillation angle of the vehicle, the speed of vehicle, and a wheel distance between the left and right drive wheels.

7. A vehicle comprising:
a processor,
a front vehicle body that suspends a front wheel in a steerable manner;
a rear vehicle body that suspends left and right drive wheels; and
an oscillation mechanism that causes the front vehicle body and the rear vehicle body to oscillate relative to each other, the processor carries out drive control of the left and right drive wheels such that the drive wheels behave differently from each other in response to oscillation of the vehicle, wherein the processor carries out the drive control of the left and right drive wheels using information on the oscillation and information on a speed of vehicle, the drive control includes determining propensities causing increase in a rotational force of an outer wheel of the left and right drive wheels relative to a rotational force of an inner wheel at the time of turn maneuvering with oscillation in response to a propensity of increase in an oscillation angle according to the information on the oscillation, and propensities causing the rotational force of the outer wheel to increase relative to the rotational force of the inner wheel causes the rotational force of the outer wheel to increase relative to the rotational force of the inner wheel when oscillation in one direction is started and a reference oscillation angle is exceeded, and the amount of increase is large at an initial stage of increase and gradually decreases.

8. A vehicle comprising:
a processor,
a front vehicle body that suspends a front wheel in a steerable manner;
a rear vehicle body that suspends left and right drive wheels; and
an oscillation mechanism that causes the front vehicle body and the rear vehicle body to oscillate relative to each other, the processor carries out drive control of the left and right drive wheels such that the drive wheels behave differently from each other in response to oscillation of the vehicle, wherein the processor carries out the drive control of the left and right drive wheels using information on the oscillation and information on a speed of vehicle, wherein the drive control includes determining propensities causing increase in a rotational force of an outer wheel of the left and right drive wheels relative to a rotational force of an inner wheel at the time of turn maneuvering with oscillation in response to a propensity of increase in an oscillation angle according to the information on the oscillation, the information on the oscillation includes an oscillation angular velocity, and a propensity causing the rotational force of the outer wheel to increase relative to the rotational force of the inner wheel causes the rotational force of the outer wheel to increase relative to the rotational force of the inner wheel in proportion to increase in the oscillation angular velocity.

* * * * *